US008531688B2

(12) United States Patent
Okada et al.

(10) Patent No.: US 8,531,688 B2
(45) Date of Patent: Sep. 10, 2013

(54) INFORMATION PROCESSING APPARATUS PROCESSING FUNCTION-RELATED INFORMATION AND IMAGE FORMING APPARATUS INCLUDING THE INFORMATION PROCESSING APPARATUS OR A COMMUNICATION APPARATUS COMMUNICABLE WITH THE INFORMATION PROCESSING APPARATUS

(75) Inventors: Mikiya Okada, Osaka (JP); Terumi Hayashi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 568 days.

(21) Appl. No.: 12/800,287

(22) Filed: May 12, 2010

(65) Prior Publication Data
US 2010/0290071 A1 Nov. 18, 2010

(30) Foreign Application Priority Data

May 18, 2009 (JP) ................................. 2009-119624

(51) Int. Cl.
*G06F 3/12* (2006.01)
*G06K 15/00* (2006.01)
(52) U.S. Cl.
USPC ......... 358/1.13; 358/1.1; 358/1.14; 358/1.15; 358/1.16; 358/1.17
(58) Field of Classification Search
None
See application file for complete search history.

(56) References Cited

U.S. PATENT DOCUMENTS

| 5,987,225 | A | 11/1999 | Okano |
| 7,221,885 | B2 | 5/2007 | Sato |
| 2002/0071689 | A1 | 6/2002 | Miyamoto |
| 2002/0144162 | A1 | 10/2002 | Tada et al. |
| 2006/0136488 | A1 | 6/2006 | Mifune et al. |
| 2006/0164669 | A1 | 7/2006 | Itou |
| 2007/0019229 | A1* | 1/2007 | Matsuhara ................... 358/1.15 |
| 2008/0199199 | A1* | 8/2008 | Kato et al. ...................... 399/81 |
| 2008/0250494 | A1 | 10/2008 | Nagata |
| 2009/0077065 | A1 | 3/2009 | Song et al. |
| 2009/0195819 | A1* | 8/2009 | Sugimoto et al. ............ 358/1.15 |

(Continued)

FOREIGN PATENT DOCUMENTS

| CN | 1794104 A | 6/2006 |
| CN | 1811609 A | 8/2006 |

(Continued)

OTHER PUBLICATIONS

Notice of Allowance issued in U.S. Appl. No. 12/800,306, mailed May 20, 2013.

*Primary Examiner* — Satwant Singh
(74) *Attorney, Agent, or Firm* — Edwards Wildman Palmer LLP; David G. Conlin; Edmund J. Koundakjian

(57) ABSTRACT

In an MFP, use history information collecting functions frequently used user by user and combination information collecting combinations of functions set by users are received from a server and stored in a use history management table and a function combination management table. When a mode is selected by a logged-in user, the use history management table is read and a function highly frequently used by the user is displayed on a touch-panel. When the selected function is established, the function combination management table is read, and a function or functions frequently combined with the established function are displayed on the touch-panel. When a job ends, the selected combination of functions is transmitted to the server.

23 Claims, 21 Drawing Sheets

(56) References Cited

U.S. PATENT DOCUMENTS

| | | | |
|---|---|---|---|
| 2009/0217193 A1* | 8/2009 | Tanaka | 715/781 |
| 2009/0310169 A1* | 12/2009 | Imaizumi et al. | 358/1.15 |
| 2010/0005167 A1* | 1/2010 | Kishimoto | 709/224 |
| 2010/0053692 A1* | 3/2010 | Machiyama | 358/403 |
| 2010/0265547 A1* | 10/2010 | Katou et al. | 358/1.16 |
| 2010/0290068 A1* | 11/2010 | Okada et al. | 358/1.9 |
| 2010/0290071 A1 | 11/2010 | Okada et al. | |
| 2010/0290085 A1* | 11/2010 | Okada et al. | 358/1.15 |
| 2011/0029888 A1* | 2/2011 | Tsujimoto | 715/743 |
| 2011/0051165 A1* | 3/2011 | Yamada et al. | 358/1.13 |
| 2011/0087724 A1* | 4/2011 | Haga | 709/202 |
| 2011/0299106 A1* | 12/2011 | Mori | 358/1.9 |

FOREIGN PATENT DOCUMENTS

| | | |
|---|---|---|
| JP | 7321984 A | 12/1995 |
| JP | 8-305516 A | 11/1996 |
| JP | 10-079818 A | 3/1998 |
| JP | 10-079819 A | 3/1998 |
| JP | 2002-006696 A | 1/2002 |
| JP | 2002182529 A | 6/2002 |
| JP | 2002-300332 A | 10/2002 |
| JP | 2004074149 A | 3/2004 |
| JP | 2004-212539 A | 7/2004 |
| JP | 2004-234195 A | 8/2004 |
| JP | 2005-045370 A | 2/2005 |
| JP | 2005-297488 A | 10/2005 |
| JP | 2006229556 A | 8/2006 |
| JP | 2006-285968 A | 10/2006 |
| JP | 2007074149 A | 3/2007 |
| JP | 2007-086865 A | 4/2007 |
| JP | 2007-130981 A | 5/2007 |
| JP | 2008054242 A | 3/2008 |
| JP | 2008-147961 A | 6/2008 |
| JP | 2008-236028 A | 10/2008 |
| JP | 2008-246812 A | 10/2008 |
| JP | 2008-258893 A | 10/2008 |
| JP | 2009077335 A | 4/2009 |

* cited by examiner

| SET FUNCTION | COMBINED FUNCTION | NUMBER OF COMBINATIONS MADE IN PAST 6 MONTHS | DISPLAY PRIORITY |
|---|---|---|---|
| 2in1／4in1 | DUPLEX | 50 | 1 |
| | TRIAL COPY | 45 | 2 |
| | DOCUMENT NUMBER COUNT | 21 | 3 |
| | ... | ... | ... |
| | ... | ... | ... |
| DUPLEX | 2in1／4in1 | 50 | 2 |
| | TRIAL COPY | 21 | 3 |
| | DOCUMENT NUMBER COUNT | 62 | 1 |
| | ... | ... | ... |
| | ... | ... | ... |

FIG. 4

| USER ID | MACHINE ID | DATE & TIME OF USE | BASIC FUNCTION (MODE) | SET FUNCTION (1) | SET FUNCTION (2) | SET FUNCTION (3) | ... |
|---|---|---|---|---|---|---|---|
| 000001 | M001 | 2009/4/6 18:06:15 | COPY | 2in1/4in1 | DUPLEX | – | – |
| 000005 | M002 | 2009/4/7 09:15:45 | COPY | 2in1/4in1 | TRIAL COPY | – | – |
| | | | FAX/IMAGE TRANSMISSION | | | | |
| | | | DOCUMENT FILING | | | | |

FIG. 6

| USER ID | BASIC FUNCTION (MODE) | SET FUNCTION | NUMBER OF SETTINGS IN PAST 6 MONTHS | DISPLAY PRIORITY |
|---|---|---|---|---|
| 000001 | COPY | 2in1/4in1 | 21 | 2 |
| | | DUPLEX | 11 | 4 |
| | | TRIAL COPY | 23 | 1 |
| | | DOCUMENT NUMBER COUNT | 12 | 3 |
| | | FRAME ERASURE | 3 | 5 |
| | | ... | ... | ... |
| | | ... | ... | ... |
| | FAX/IMAGE TRANSMISSION | | | |
| | DOCUMENT FILING | | | |
| 000002 | | | | |
| 000003 | | | | |
| 000004 | | | | |
| 000005 | | | | |
| ... | | | | |

FIG. 13

| USER ID | GROUP ID |
|---|---|
| 000001 | G001 |
| 000002 | G001 |
| 000003 | G002 |
| 000004 | G001 |
| 000005 | G002 |
| ... | |

FIG. 23

| USER ID | WEIGHT (DEGREE OF PROFICIENCY) |
|---|---|
| 000001 | 1.05 |
| 000002 | 0.55 |
| 000003 | 1.20 |
| 000004 | 0.75 |
| 000005 | 1.55 |
| ... | ... |

FIG. 14

| GROUP ID | SET FUNCTION | COMBINED FUNCTION | NUMBER OF COMBINATIONS MADE IN PAST 6 MONTHS | DISPLAY PRIORITY |
|---|---|---|---|---|
| G001 | 2in1/4in1 | DUPLEX | 150 | 1 |
| | | TRIAL COPY | 145 | 2 |
| | | DOCUMENT NUMBER COUNT | 121 | 3 |
| | | ... | ... | ... |
| | DUPLEX | 2in1/4in1 | 150 | 2 |
| | | TRIAL COPY | 121 | 3 |
| | | DOCUMENT NUMBER COUNT | 162 | 1 |
| | | ... | ... | ... |
| G002 | | | | |
| G003 | | | | |
| G004 | | | | |
| G005 | | | | |
| ... | | | | |

FIG. 15

| GROUP ID | BASIC FUNCTION (MODE) | SET FUNCTION | NUMBER OF SETTINGS IN PAST 6 MONTHS | DISPLAY PRIORITY |
|---|---|---|---|---|
| G001 | COPY | 2in1/4in1 | 121 | 2 |
| | | DUPLEX | 111 | 4 |
| | | TRIAL COPY | 123 | 1 |
| | | DOCUMENT NUMBER COUNT | 112 | 3 |
| | | FRAME ERASURE | 13 | 5 |
| | | ... | ... | ... |
| | FAX/IMAGE TRANSMISSION | ... | ... | ... |
| | DOCUMENT FILING | | | |
| G002 | | | | |
| G003 | | | | |
| G004 | | | | |
| G005 | | | | |
| ... | | | | |

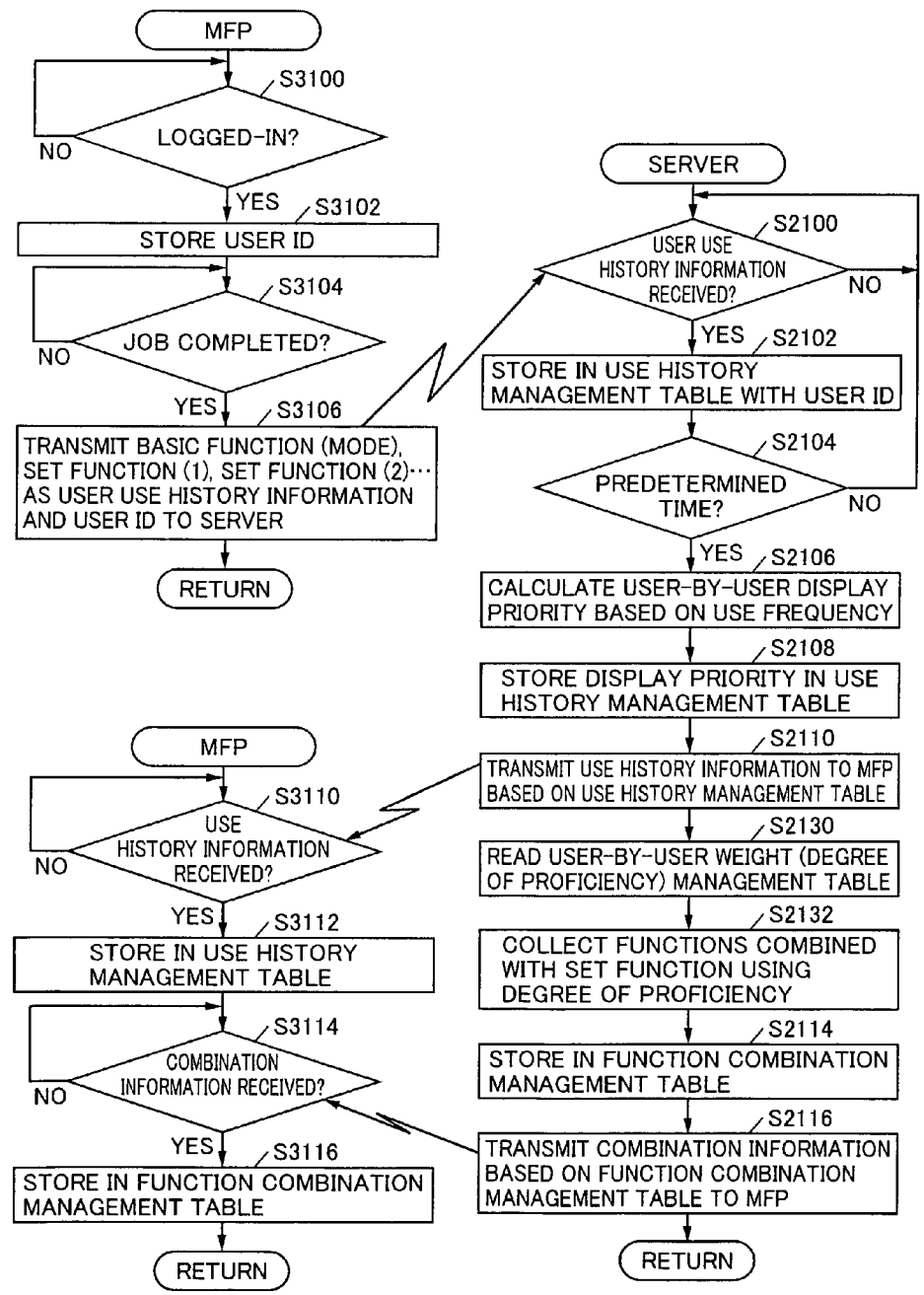

INFORMATION PROCESSING APPARATUS PROCESSING FUNCTION-RELATED INFORMATION AND IMAGE FORMING APPARATUS INCLUDING THE INFORMATION PROCESSING APPARATUS OR A COMMUNICATION APPARATUS COMMUNICABLE WITH THE INFORMATION PROCESSING APPARATUS

CROSS-REFERENCE TO RELATED APPLICATION

This nonprovisional application claims priority under 35 U.S.C. §119(a) on Patent Application No. 2009-119624 filed in Japan on May 18, 2009, the entire contents of which are hereby incorporated by reference.

BACKGROUND OF THE INVENTION

1. Field of the Invention

The present invention relates to a technique of displaying an appropriate operation guide in accordance with a situation of use in an image forming apparatus having a number of functions, so as to allow a user to easily select a suitable function from among a large number of functions. More specifically, the present invention relates to a technique allowing a user to select even a combination not known to the user, when a plurality of functions are to be combined and used from among a large number of functions.

2. Description of the Background Art

It has become increasingly common to connect an image forming apparatus having a printer function or a copy function to a network, to allow use by a plurality of users. Further, the number of apparatuses having a plurality of functions (modes) such as a copy function, a facsimile function (hereinafter "facsimile" may also be denoted as FAX or fax), a network-supported printer function and a scanner function, such as multi-function peripherals, is increasing. In such a multi-function peripheral, each user selects a basic function (mode) and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such a multi-function peripheral (image forming apparatus), the user inputs image data using, for example, the scanner function, performs image processing (such as collection) by inputting various instructions through an operation panel, and prints the results using the printer function. Some apparatuses allow the user to confirm the result of processing, by providing a thumb-nail image or a preview image to ease user operation. Further, some apparatuses convert such a series of user operations to a macro command and automatically registers with a key, or display operation history as a menu, so as to allow the user to easily instruct the same process. Further, some apparatuses predict and present possible next operation command based on a comparison between operation history and recent operations or based on operation frequency, so as to eliminate the necessity to perform complicated menu selecting operation.

Japanese Patent Laying-Open No. 2008-236028 (Document 1) discloses an image forming apparatus in which an appropriate predicted menu in accordance with the situation of use of the image forming apparatus is displayed, so as to allow the user to easily instruct an image processing function that is often used. The image forming apparatus disclosed in Document 1 includes: a history management unit managing the operation history of the user; a function count management unit counting the state of use of processing functions in the operation history, and outputting a process count value; a prediction control unit predicting image processing operations with priority based on the process count value, and generating a prediction menu; an image working control unit forming an image of reduced size indicating expected result of processing of the object image based on the predicted image processing operation; a preview display control unit displaying the prediction menu including the image of expected result on an operation unit in accordance with the priority; and a process executing unit executing, in response to selection of one item of the prediction menu, the corresponding image processing.

In the image forming apparatus, the operation history of the user is managed; the state of use of process functions in the operation history is counted and the process count value is output; image processing operations are predicted with priority based on the process count value and a plurality of prediction menus are formed accordingly; an image reduced in size is formed representing the expected result of processing based on the predicted image processing operation; the prediction menu including the image of expected result is displayed on the operation unit in accordance with the priority, for every destination of output of the processed result; and in response to selection of one item of the prediction menu, the corresponding image processing is executed. Therefore, an appropriate prediction menu in accordance with the situation of use of the image forming apparatus is displayed, and the image processing function often used by the user can be used without necessitating complicated settings.

Japanese Patent Laying-Open No. 2005-297488 (Document 2) discloses an image forming apparatus allowing, even when a user uses an image forming apparatus that he/she has never operated in the past, the user to utilize operation history stored in another image forming apparatus of a similar type, if the user has an experience of using the image forming apparatus of the similar type that is communicable with the image forming apparatus to be used. The image forming apparatus disclosed in Document 2 includes: an operation history storing unit storing operation history based on operation instructions input through an input unit; a communication unit performing data communication with one or a plurality of other image forming apparatuses communicable through a prescribed network; operation history collecting unit collecting operation histories from the one or plurality of other image forming apparatuses using the communication unit; an operation history integrating unit integrating the operation history stored in the operation history storing unit and the operation history collected by the operation history collecting unit from the one or plurality of other image forming apparatuses; an operation history display unit controlling display on a display unit of the operation histories integrated by the operation history integrating unit; an operation history selecting unit selecting an arbitrary operation history from the operation histories displayed on the display unit; and a setting unit setting the image forming apparatus based on the operation history selected by the operation history selecting unit.

In the image forming apparatus, operation history based on operation instructions is stored in the storage unit; operation histories are collected from one or a plurality of other image forming apparatuses communicable through a prescribed communication medium; the operation history stored in the storage unit and the operation history or histories collected from the one or plurality of other image forming apparatuses are integrated; the integrated operation histories are displayed controlled on the display unit; an arbitrary operation history is selected from the displayed operation histories; and setting is done based on the selected operation history. Therefore, even when the user uses an image forming apparatus he/she has never operated before (no operation history is stored), it is possible to use operation history stored in another image forming apparatus of a similar type, if the user has operated the image forming apparatus of the similar type communicable to the image forming apparatus to be used (that is, operation history is stored in the image forming apparatus of the similar type). Therefore, even if the image forming apparatus is to be used for the first time, it is possible to reduce the trouble of setting each and every item from scratch. Thus, the conventional problem that all settings must be done from scratch when a new image forming apparatus is to be used as operation history of other image forming apparatus is unavailable, can be solved. The user can easily select and re-use desired operation history, and the operation history stored in each image forming apparatus can effectively be utilized, whereby operation efficiency and productivity can be improved.

SUMMARY OF THE INVENTION

Recent multi-function peripherals have a large number of different functions, to meet various and many demands of the users. When a user using such a multi-function peripheral repeatedly selects the same function, it is possible by the technique disclosed in Document 1 to reduce complicated operations, since the function to be selected next by the user is predicted with high accuracy and the prediction menu is displayed. According to the technique disclosed in Document 2, even when an image forming apparatus not operated in the past is to be used, it is possible to utilize operation history stored in an image forming apparatus of a similar type and to select the same function, if the image forming apparatus of the similar type has been operated in the past, so that operability can be improved.

If a multi-function peripheral has a huge number of functions, however, it is expected that each user uses combinations of only a very limited functions. For instance, though a skilled user may use a combination of appropriate functions to save energy, a beginner may not know and hence not use such a combination of functions. Particularly, when a multi-function peripheral is connected through a network and shared by various users, skills of users vary, and it is very likely that only some users having high degree of proficiency know combinations of functions that attain job-related high efficiency while other users are not aware of such combinations.

It is often the case that users belonging to the same department (group) form similar documents (prints on sheets of recording paper). Even in one same group, there are users who know combinations of functions that are highly efficient to the job of the group and users who do not know such combinations. In such a case, a user (particularly, a beginner) who does not know a combination of efficient functions will not know such a combination of functions, until he/she happens to find such a combination by himself/herself. Considering the large number of functions provided by recent multi-function peripherals, it would be difficult for a user to find an efficient combination of functions by himself/herself. Further, a user who knows such efficient combinations of functions often fail to notice presence of such novice users, unless he/she is a person who receives such documents, since it may be necessary to actually look at the output from the multi-function peripheral printed on the sheet of recording paper to notice the level of proficiency. It is not likely that when a person uses a multifunction peripheral, another person checks and confirms the output at the site. Therefore, it follows that a beginner selects functions of the multifunction peripheral not knowing the combinations of functions used by a skilled user, while a skilled user is unaware of such situation of beginners.

The present invention was made to solve the above-described problem, and its object is to provide an information processing apparatus processing information related to a function that can be combined to another function, an image forming apparatus having the information processing apparatus, or an image forming apparatus having a communication apparatus communicable with the information processing apparatus, allowing, in an image forming apparatus having various and may functions in which the functions are appropriately combined and used, even a beginner to appropriately combine and use a number of functions, by appropriately presenting combinations of functions not known to the beginner but known by other user or users.

According to an aspect, the present invention provides an information processing apparatus processing information related to a combination of functions selected by a user from a plurality of functions of an image forming apparatus. The information processing apparatus includes: an obtaining unit obtaining use history information related to the function selected by the user; a use history storage unit storing, with user identification information, the use history information; a first collecting unit collecting user-by-user history information related to frequency of use of functions, based on the stored use history information; a second collecting unit collecting combination information related to frequency of combination between one function and another function, based on the stored use history information; and an applying unit applying the collected user-by-user history information and the combination information to the image forming apparatus.

In the information processing apparatus, use history information related to the function selected by the user in the image forming apparatus is obtained and user-by-user history information related to the frequency of used functions is collected, and based on the pieces of use history information of many users, combination information related to the frequency of combination of one function and another function is collected. The collected user-by-user history information and the combination information are given to the image forming apparatus. Based on the user-by-user history information and the combination information collected by the information processing apparatus, it becomes possible for the image forming apparatus to display a function often used by the user of the image forming apparatus, and to display a function often combined with the function selected by the user. As a result, in an image forming apparatus having various and may functions in which the functions are appropriately combined and used, it becomes possible to present a function often used by the user himself/herself and, in addition, to appropriately present a combination or combinations of functions not known to the user himself/herself but known to other user or users. Thus, even a beginner can easily select a function often used by himself/herself and can appropriately combine and use many functions.

The information processing apparatus in accordance with another aspect of the present invention includes: a storage unit storing, in relation to user identification information, group identification information indicating a department to which the user belongs; a use history storage unit storing, with the user identification information, the use history information; a first collecting unit collecting user-by-user history information related to frequency of use of functions, based on the stored use history information; a second collecting unit collecting group-by-group combination information related to frequency of combination between one function and another function, based on the stored use history information; and an applying unit applying the collected user-by-user history information and the group-by-group combination information to the image forming apparatus.

In the information processing apparatus, use history information related to the function selected by the user in the image forming apparatus is obtained and user-by-user history information related to the frequency of used functions is collected, and based on the pieces of use history information of many users, combination information related to the frequency of combination of one function and another function is collected group by group of the users. The collected user-by-user history information and the group-by-group combination information are given to the image forming apparatus. Based on the user-by-user history information and the group-by-group combination information collected by the information processing apparatus, it becomes possible for the image forming apparatus to display a function often used by the user of the image forming apparatus, and to display a function often combined in the group to which the user belongs, with the function selected by the user. As a result, in an image forming apparatus having various and may functions in'which the functions are appropriately combined and used, it becomes possible to present a function often used by the user himself/herself and, in addition, to appropriately present a combination or combinations of functions not known to the user himself/herself but known to other user or users of the same group. Thus, even a beginner can easily select a function often used by himself/herself and can appropriately combine and use many functions.

The information processing apparatus according to a further aspect of the present invention includes: a storage unit storing, in relation to user identification information, group identification information indicating a department to which the user belongs; a use history storage unit storing, with the user identification information, the use history information; a first collecting unit collecting group-by-group history information related to frequency of use of functions, based on the stored use history information; a second collecting unit collecting group-by-group combination information related to frequency of combination between one function and another function, based on the stored use history information; and an applying unit applying the collected group-by-group history information and the group-by-group combination information to the image forming apparatus.

In the information processing apparatus, use history information related to the function selected by the user in the image forming apparatus is obtained and history information related to the frequency of used functions is collected group by group of the users, and based on the pieces of use history information of many users, combination information related to the frequency of combination of one function and another function is collected group by group. The collected group-by-group history information and the group-by-group combination information are given to the image forming apparatus. Based on the group-by-group history information and the group-by-group combination information collected by the information processing apparatus, it becomes possible for the image forming apparatus to display a function often used by the group to which the user of the image forming apparatus belongs, and to display a function often combined in the group to which the user belongs, with the function selected by the user. As a result, in an image forming apparatus having various and may functions in which the functions are appropriately combined and used, it becomes possible to present a function often used by the group to which the user belongs and, in addition, to appropriately present a combination or combinations of functions not known to the user himself/herself but known to other user or users of the same group. Thus, even a beginner can easily select a function often used by himself/herself and can appropriately combine and use many functions.

The information processing apparatus may include a degree information storing unit storing degree of proficiency of each user. Then, the second collecting unit may collect the combination information using the degree of proficiency.

The combination information collected by using the degree of proficiency of the user using the image forming apparatus (level of skill in using the image forming apparatus) may be prepared such that frequency of combination of functions selected by a user or users of high skill related to the image forming apparatus is counted higher. A display may be provided on the image forming apparatus to recommend (to urge selection of) the combination of functions selected by such a user. By such an approach, it is possible to appropriately present an efficient function known only to skilled users to a beginner.

The second collecting unit may collect the combination information such that the higher becomes the degree of proficiency, the higher becomes the frequency.

A combination of functions selected by a user having higher skill will be collected to have higher frequency, so that the combination is displayed with higher priority on the image forming apparatus.

According to a further aspect, the present invention provides an image forming apparatus including any of the above-described information processing apparatuses. According to a still further aspect, the present invention provides an image forming apparatus including a communication apparatus communicable with any of the above-described information processing apparatuses.

It becomes possible, using the combination information obtained from the information processing apparatus, for the user to easily select a combination of appropriate functions in the image forming apparatus.

The image forming apparatus may further include: a user information storage unit storing the user-by-user history information and the combination information; an identifying unit identifying a user who is to use the image forming apparatus; a selecting unit allowing the user to select one function from a plurality of functions; and a display unit, displaying a function highly frequently used by the identified user based on the user-by-user history information, and displaying a function combined with high frequency with the selected function based on the combination information.

In the image forming apparatus, the function often used by the user is displayed, and when one function is selected by the user, a function highly frequently combined with the selected one function is displayed. The function that is highly frequently combined involves many users (many people other than the user himself/herself) and, therefore it becomes possible to easily know useful combination of a function not known to the user but known to others, in relation to the function selected by the user himself/herself. Here, since the function often used by the user is displayed, the user can easily select the function.

The image forming apparatus may further include: a group information storage unit storing the user-by-user history information and the group-by-group combination information; an identifying unit identifying a user who is to use the image forming apparatus; a selecting unit allowing the user to select one function from a plurality of functions; and a display unit, displaying a function highly frequently used by the identified user based on the user-by-user history information, and displaying a function combined with high frequency with the selected function in the group to which the user belongs, based on the group-by-group combination information.

In the image forming apparatus, the function often used by the user is displayed, and when one function is selected by the user, a function highly frequently combined with the selected one function in the group to which the user belongs is displayed. The function that is highly frequently combined involves many users belonging to the same group as the user (many people other than the user himself/herself) and, therefore it becomes possible to easily know useful combination of a function not known to the user but known to others belonging to the same group, in relation to the function selected by the user himself/herself. Here, since the function often used by the user is displayed, the user can easily select the function.

The image forming apparatus may further include: a group information storage unit storing the group-by-group history information and the group-by-group combination information; an identifying unit identifying a user who is to use the image forming apparatus; a selecting unit allowing the user to select one function from a plurality of functions; and a display unit, displaying a function highly frequently used by the group to which the identified user belongs, based on the group-by-group history information, and displaying a function combined with high frequency with the selected function in the group to which the user belongs, based on the group-by-group combination information.

In the image forming apparatus, the function often used by the group to which the user belongs is displayed, and when one function is selected by the user, a function highly frequently combined with the selected one function in the group to which the user belongs is displayed. The function that is highly frequently combined involves many users belonging to the same group as the user (many people other than the user himself/herself) and, therefore it becomes possible to easily know useful combination of a function not known to the user but known to others belonging to the same group, in relation to the function selected by the user himself/herself. Here, since the function often used by the group to which the user belongs is displayed, the user can easily select the function.

The display unit may display functions that are combined with high frequency in order, starting from a function of the highest frequency.

It is possible to know a function, not known to the user himself/herself but used in combination by many users, easily in relation to the function selected by the user himself/herself.

The display unit displays the function or functions that are combined with high frequency, excluding a function not available in the apparatus.

Image forming apparatuses do not always have the same functions. Since a combination of functions not selectable in the image forming apparatus of interest is excluded from the display, confusion by the user can be avoided.

According to the information processing apparatus and the image forming apparatus including the information processing apparatus or the image forming apparatus including a communication apparatus communicable with the information processing apparatus, in an image forming apparatus having various and may functions in which the functions are appropriately combined and used, it becomes possible to appropriately present a combination or combinations of functions not known to the user himself/herself but known to other user or users. Particularly, a function often selected by the user himself/herself or often selected by the group to which the user belongs is displayed, and a function often combined by other user or often combined by the group to which the user belongs with the function selected by the user is displayed. As a result, even a beginner can use the image forming apparatus while appropriately combining many functions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a use history management table stored in the server computer of FIG. 1.

FIG. 6 shows a user-by-user use history management table stored in the server computer of FIG. 1.

FIG. 13 shows a group management table stored in a server computer in accordance with a second embodiment of the present invention.

FIG. 14 shows a group-by-group function combination management table stored in the server computer in accordance with the second embodiment of the present invention.

FIG. 15 shows a group-by-group use history management table stored in the server computer in accordance with the second embodiment of the present invention.

FIG. 23 shows a user-by-user weight (proficiency degree) management table stored in a server computer in accordance with a fifth embodiment of the present invention.

FIG. 24 is a flowchart representing a control structure of a use history processing program executed by the server computer and MFP in accordance with the fifth embodiment of the present invention.

DESCRIPTION OF THE PREFERRED EMBODIMENTS

Figure 1:
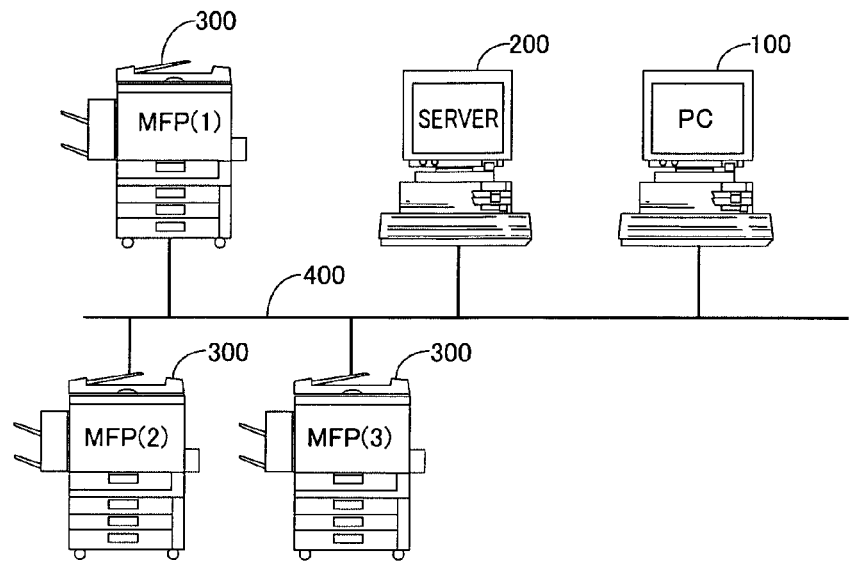
FIG. 1 shows an overall configuration of a network image forming system including an information processing apparatus (server computer) and an image forming apparatus (MFP) in accordance with a first embodiment of the present invention.

In the following description, the same components are denoted by the same reference characters. Their functions and names are also the same. Therefore, detailed description thereof will not be repeated. In the following description, it is assumed that the image forming apparatus for forming an image on a sheet of recording paper is an MFP (Multifunction Peripheral). The present invention, however, is applicable to any apparatus having at least the printing function and in which various and many functions are combined and used, and application is not limited to an MFP.

Further, in the following description, it is assumed that the information processing apparatus processing information related to the function to be combined with selected one function is a server computer.

The information processing apparatus, however, may be included in the MFP. Further, though a network image forming system including a plurality of MFPs is described, the network image forming system may be formed simply by one MFP including the information processing apparatus mentioned above.

—First Embodiment—

[Overall System Configuration]

Referring to FIG. 1, an overall configuration of the network image forming system in accordance with the first embodiment of the present invention will be described. The network image forming system includes: a personal computer (PC) 100; MFP(1) 300 to MFP(3) 300 (hereinafter MFP(1) 300 to MFP (3) 300 may be generally referred to as MFP 300) receiving a copy request or a print request and printing an image on a sheet of recording paper; and a server computer 200 processing use history of users of the plurality of MFPs 300. Client computer 100, server computer 200 and MFP 300 are connected to be communicable to each other by a network line 400 in accordance with, for example, IEEE802.3. Though MFP(1) 300 to MFP(3) 300 are denoted by the same reference characters, they are not necessarily MFPs having the same functions.

In the present embodiment, server computer 200 stores use history of a user in MFP 300 received through network line 400, together with a user ID for uniquely identifying the user, in a use history management table. Server computer 200 collects functions used in MFP 300 user by user based on the use history of each user, and stores the results in user-by-user use history management table. Server computer 200 transmits the user-by-user use history information to MFP 300 through network line 400. Based on the user-by-user use history information received from server computer 200, MFP 300 displays a function used with high frequency by a logged-in user on a touch-panel display.

Further, based on the use histories of many users, server computer 200 collects function combination information of functions used in combination in MFP 300, and stores the results in function combination management table. Server computer 200 transmits the combination information to MFP 300 through network line 400. Based on the combination information received from server computer 200, MFP 300 displays a function often combined with the function selected by the user on the touch-panel display.

In this manner, in the present embodiment, the function often used by the user logged-in to use the MFP and the function often combined with the function selected by the user are displayed on the touch-panel.

In the following, in the specification and drawings, server computer 200 may be simply referred to as a server, and MFP 300 may be simply referred to as an MFP.

[Hardware Configuration]

<Server Computer 200>

Figure 2:
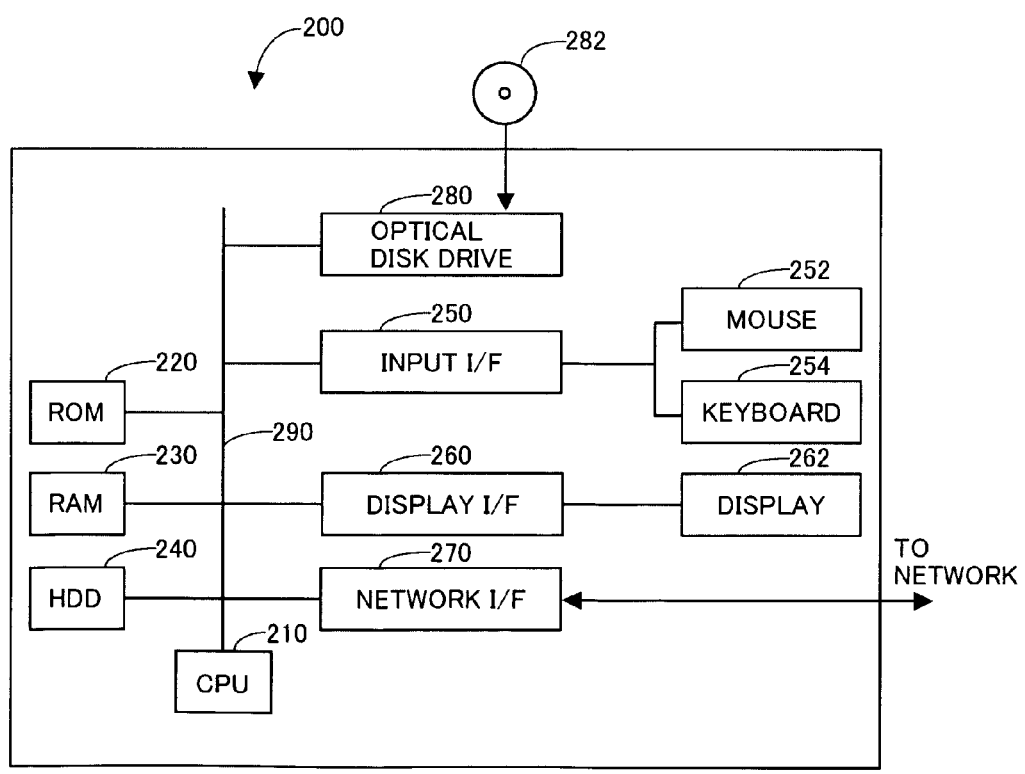
FIG. 2 is a control block diagram showing hardware configuration of the server computer shown in FIG. 1.

Referring to FIG. 2, server computer 200 forming the network image forming system in accordance with the present embodiment includes: a bus 290; a CPU (Central Processing Unit) 210 connected to bus 290; an ROM (Read Only Memory) 220 connected to bus 290; an RAM (Random Access Memory) 230 connected to bus 290; a hard disk (HDD) 240 connected to bus 290; an optical disk drive 280, connected to bus 290, on which an optical disk 282 is mountable, and capable of writing of information to optical disk 282 and reading of information from optical disk 282; an input interface (hereinafter referred to as "input I/F") 250, connected to bus 290, for providing an interface for connection between a mouse 252 and a keyboard 254; a display interface (hereinafter referred to as a "display I/F") 260, connected to bus 290, for providing an interface related to connection with a display 262; and a network interface (hereinafter referred to as a "network I/F") 270 providing wired or wireless (in the present embodiment, wired) connection to network line 400. Server computer 200 may include a magnetic disk drive on which a magnetic disk is mountable, and capable of writing of information to the magnetic disk and reading of information from the magnetic disk, in place of/in addition to optical disk drive 280.

Bus 290, ROM 220, RAM 230, hard disk 240, optical disk drive 280, input I/F 250, display I/F 260 and network I/F 270 all operate in cooperation with each other under the control of CPU 210, and as the server computer in accordance with the present invention, server computer 200 realizes processes of various applications. Such applications realize a server computer of a network image forming system for appropriately presenting a combination of functions often used, for example, in MFP 300.

The computer program or programs causing server computer 200 to operate as the server computer of the network image forming system in accordance with the present embodiment are stored in optical disk 282 to be inserted to optical disk drive 280, and transferred to hard disk 240. Alternatively, the programs may be transmitted through network line 400 to server computer 200 and stored in hard disk 240. At the time of execution, the programs are loaded to RAM 230. The programs may be directly loaded to RAM 230 from optical disk 282 or through network line 400.

These programs include a plurality of instructions causing server computer 200 to operate as the server computer in the network image forming system in accordance with the present embodiment. Some of the basic functions necessary to realize these operations are provided by an operating system (OS) operating on server computer 200 or a third-party program, or a module of various tool kits installed in server computer 200. Therefore, the program may not necessarily include all functions required to realize the method and system in accordance with the present embodiment. The program may include only the instructions executing a prescribed process as server computer 200 described above, by calling appropriate functions or "tools" in a controlled manner to attain the desired results. General operations of a computer as the substance of server computer 200 are well known and, therefore, description will not be given here.

Personal computer 100 also has a configuration similar to that of server computer 200 described above. In personal computer 100, a printer driver, for example, is installed. Document data formed by an application such as a word processor is transmitted through the printer driver to MFP 300.

<MFP 300>

Figures 3, 5:
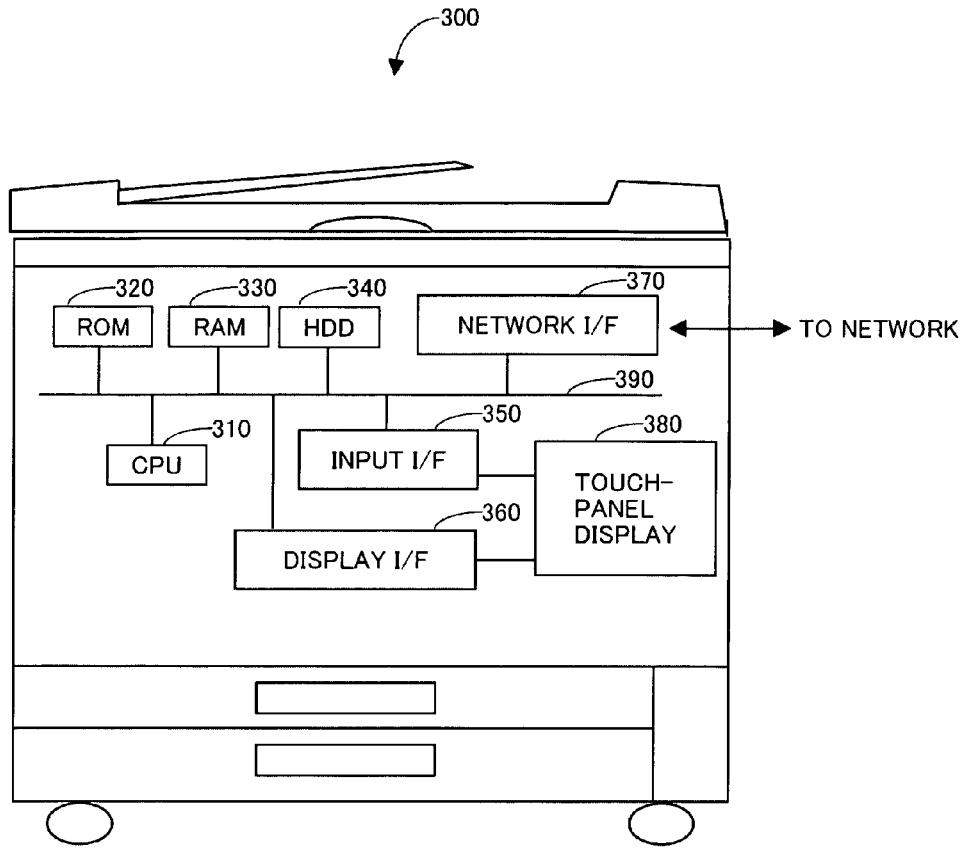
FIG. 3 is a control block diagram showing hardware configuration of the MFP shown in FIG. 1.
FIG. 5 shows a function combination management table stored in the server computer of FIG. 1.

Referring to FIG. 3, MFP 300 forming the network image forming system in accordance with the present embodiment includes: a bus 390; a CPU 310 connected to bus 390; an ROM 320 connected to bus 390; an RAM 330 connected to bus 390; an HDD 340 connected to bus 390; an input I/F 350 and a display I/F 360, connected to bus 390, for providing interface related to connection with touch-panel display 380; and a network I/F 370 providing wired or wireless (in the present embodiment, wired) connection to network line 400. Though not shown in FIG. 3, MFP 300 includes hardware buttons such as a start button and ten-key buttons. Further, MFP 300 has a function of allowing a user to log-in, to use MFP 300. By way of example, it includes an input unit receiving an input of a user number (such as a company member number) as a user ID, and a determining unit determining whether the input number is a user number registered in advance. The input unit may be a fingerprint input unit and the determining unit may be a fingerprint recognizing unit. Any biometric information other than the fingerprint may be used.

Bus 390, ROM 320, RAM 330, hard disk 340, input I/F 350, display I/F 360 and network I/F 370 all operate in cooperation with each other under the control of CPU 310, and realize the printing process, FAX transmission/reception process, scanner process and copy process in MFP 300. These processes are executed by various components forming MFP 300, not shown in FIG. 3, under the control of CPU 310.

MFP 300 includes, for example, a document reading unit, an image forming unit, a paper feed unit, and a paper discharge unit. In MFP 300, on image data of an original document read by the document reading unit, various image processing operations are done by CPU 310, and the resulting image data is output to the image forming unit. MFP 300 includes a so-called laser type (electrophotographic type) printing function, in which a laser beam is used for exposure. It may have a different type printing function.

The image forming unit is for printing an image represented by the image data on a sheet of recording paper, and it includes, by way of example, a photoreceptor drum, a charger, a laser scanning unit, a developer, a transfer device, a cleaning device, a fixing device and a neutralizer. In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray. The paper discharging device may perform a process of sorting a plurality of printed sheets of paper to be output to different discharge trays, a process of punching each sheet of recording paper or a process of stapling the sheets of recording paper. Assume that a number of copies of the printing are to be prepared. In that case, sheets of recording paper are sorted and discharged to paper discharge trays such that each tray contains each set of printed sheets, and the set of printed sheets in each tray is stapled or punched, whereby copies of prints are prepared. Such processes are performed under the control of CPU 310. Punching process may be done on each sheet of the printing paper.

[Management Table Configuration]

Referring to FIG. 4, the use history management table stored in HDD 240 of server computer 200 will be described. The use history management table stores use history representing which function or a combination of which functions is utilized by the user in MFP 300, based on the use history information transmitted from MFP 300. If functions are not combined, only the selected one function is stored as the use history.

As shown in FIG. 4, the use history table consists of: a field for storing user ID for uniquely identifying a user; a field for storing machine ID for uniquely identifying MFP 300; a field for storing information related to date and time of use; a field for storing basic function used (copy mode, fax/image transmission mode, document filing mode and the like); and fields for storing set function (1), set function (2), set function (3) . . . used in combination. The set functions may be stored assuming that the user set the functions time-sequentially in the order of set function (1), set function (2), set function (3) . . . , or the function or functions may be stored in accordance with a predetermined priority.

Referring to FIG. 5, a function combination management table stored in HDD 240 of server computer 200 will be described. The function combination management table stores, based on the use history information stored in the use history table shown in FIG. 4, the number of combinations of functions combined to a set function, and display priority that corresponds to the number of combinations in descending order.

As shown in FIG. 5, the function combination management table consists of a field for storing the set function (corresponding to set function (1) of FIG. 4); a field for storing a function (corresponding to set function (2) or set function (3) of FIG. 4) combined with the set function; a field for storing the number of combinations representing how many times the function has been combined in the past six months; and a field for storing the display priority based on the number of combinations.

In FIG. 5, a combination of set function (1) (for example, 2-in-1/4-in-1) and set function (2) (for example, duplex) is also a combination of set function (1) (for example, duplex)

and set function (2) (for example, 2-in-1/4-in-1). Therefore, if these functions are combined, the number of combinations is counted twice. If three functions are combined, three combinations, that is, the combination of set functions (1) and (2), the combination of set functions (1) and (3), and the combination of set functions (2) and (3) are counted.

Though the period for collecting the number of combinations is set to past six months in the example of FIG. 5, the present invention is not limited to the above. The period may be shorter or longer, or the period may be set by a user (in this case, the user may include an administrator).

Referring to FIG. 6, a user-by-user use history management table stored in HDD 240 of server computer 200 will be described. In the user-by-user use history management table, use history representing which user used which function in MFP 300 is collected user by user, based on the use history information transmitted from MFP 300.

As shown in FIG. 6, the user-by-user use history management table consists of; a field for storing user ID for uniquely identifying a user; a field for storing basic function used (copy mode, fax/image transmission mode, document filing mode and the like); a field for storing the set function used with the basic function; a field for storing the number of settings representing how many times the function is set in the past six months; and a field for storing display priority based on the number of settings.

[Software Configuration]

Figure 7:
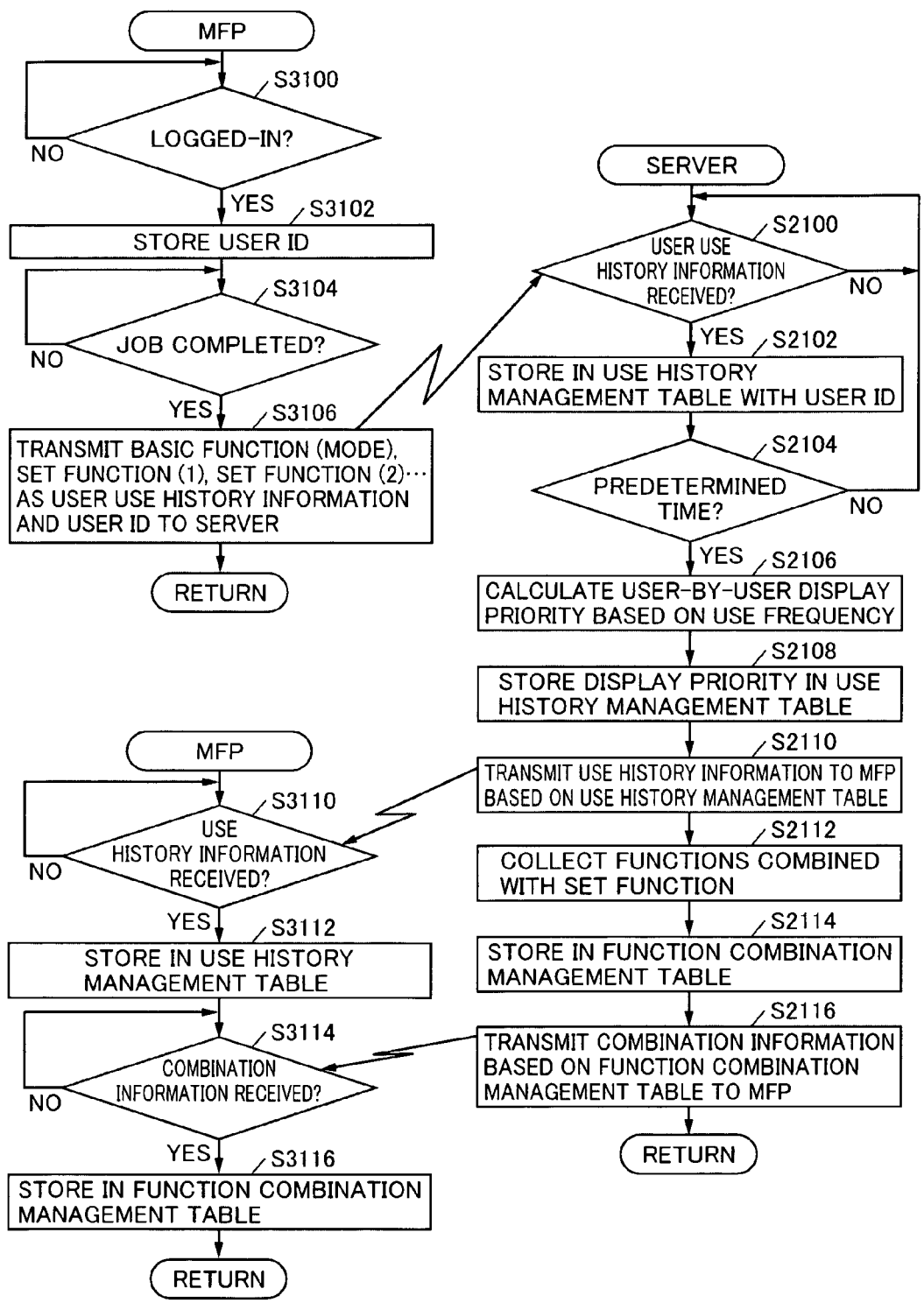
FIG. 7 is a flowchart representing a control structure of a use history processing program executed in the server computer and the MFP of FIG. 1, respectively.

Referring to FIG. 7, a control structure of a computer program executed by server computer 200 and MFP 300 to realize the user use history processing in the network image forming system in accordance with the present embodiment will be described.

The program shown on the upper left side of FIG. 7 is executed by CPU 310 of MFP 300. At step (hereinafter, "step" will be denoted by "S") 3100, CPU 310 of MFP 300 (hereinafter simply referred to as CPU 310) determines whether or not a user of MFP 300 has requested log-in and successfully logged-in. At this time, CPU 310 displays a user number input image or a fingerprint input image on touch-panel display 380, and when a user number is input or a fingerprint of the user is input, it determines that the user who is going to use MFP 300 has logged-in. If the user who is to log-in is determined to be a user registered in advance based on the user number or the user fingerprint, CPU 310 permits log-in. If CPU 310 permits log-in, a determination of successful log-in is made. If it is determined that the user of MFP 300 has successfully logged-in (YES at S3100), the process proceeds to S3102. Otherwise (NO at S3100), the process returns to S3100, and waits until it is determined that a user of MFP 300 has logged-in.

At S3102, CPU 310 stores a user ID for uniquely identifying a user, registered in correspondence with the input user number or the fingerprint of the user.

At S3104, CPU 310 determines whether or not a job in MFP 300 is completed. Here, if the requested process ends successfully, CPU 310 determines that the job in MFP 300 is completed. If it is determined that the job in MFP 300 is completed (YES at S3104), the process proceeds to S3106. Otherwise (NO at S3104), the process returns to S3104, and waits until it is determined that the job in MFP 300 is completed.

At S3106, CPU 310 transmits, together with the user ID, the basic function (mode), set function (1), set function (2) . . . , of the job that is determined to be completed, as user use history information, to server computer 200.

The program shown on the right side of FIG. 7 is executed by CPU 210 of server computer 200. At S2100, CPU 210 of server computer 200 (hereinafter simply referred to as CPU 210) determines whether or not the user use history information is received from MFP 300. At this time, determination is made for a plurality of MFPs 300. If it is determined that the user use history information is received from MFP 300 (YES at S2100), the process proceeds to S2102. Otherwise (NO at S2100), the process returns to S2100, and waits until it is determined that the user use history information is received from MFP 300.

At S2102, CPU 210 stores the user use history information received from MFP 300 in use history management table shown in FIG. 4, with user ID. Pieces of user use history information are received from a plurality of MFPs 300 and stored in the use history management table, whereby many pieces of use history information come to be stored together with the user IDs, in use history management table. In FIG. 4, pieces of information of which date and time of use is older than six months are erased, or not reflected on the collection of combined functions.

At S2104, CPU 210 determines whether a predetermined time is reached. The predetermined time corresponds to a time interval for collecting the combined functions. If it is determined that the predetermined time (for example, time corresponding to the time interval of 12 hours) is reached (YES at S2104), the process proceeds to S2106. Otherwise (NO at S2104), the process returns to S2100. The process flows in this manner since collecting the combined functions may be done with appropriate time interval, while updating of use history management table is done on real time basis upon reception of the use history information from a plurality of MFPs 300.

At S2106, CPU 210 calculates the display priority based on the frequency of use of MFP 300 user by user, based on the use history information stored in the use history management table. At S2108, CPU 210 stores the calculated display priority in the user-by-user use history management table shown in FIG. 6.

At S2110, CPU 210 transmits the user-by-user use history information (set function, used function and display priority) to MFP 300, based on the user-by-user use history management table. In order to reduce communication traffic, transmission of user-by-user use history information to MFP 300 may be transmission of only the portions that changed after the last transmission, as difference data. Further, the time interval for updating the function combination management table and the time interval for transmitting the user-by-user use history information to MFP 300 may be different from each other.

At S2112, CPU 210 collects the functions combined with the set function, based on the use history information stored in the use history management table. At S2114, CPU 210 stores the results of collection in the function combination management table shown in FIG. 5. Thus, the function combination management table is updated at a constant time interval.

At S2116, CPU 210 transmits the combination information (set function, combined function and display priority) to MFP 300, based on the function combination management table. In order to reduce communication traffic, transmission of combination information to MFP 300 may be transmission of only the portions that changed after the last transmission, as difference data. Further, the time interval for updating the function combination management table and the time interval for transmitting to MFP 300 may be different from each other.

The program shown on the lower left side of FIG. 7 is executed by CPU 310 of MFP 300. At S3110, CPU 310 determines whether or not the user-by-user use history information is received from server computer 200. If it is determined that the user-by-user use history information is received from server computer 200 (YES at S3110), the process proceeds to S3112. Otherwise (NO at S3110), the process returns to S3110, and waits until it is determined that the user-by-user use history information is received from server computer 200.

At S3112, CPU 310 stores the user-by-user use history information received from server computer 200 in the user-by-user use history management table. At this time, CPU 310 stores a management table in which the set number field for the past six months removed from the user-by-user use history management table shown in FIG. 6 as the user-by-user use history management table, in HDD 340. Thus, it is possible in each of the plurality of MFPs 300 to store user by user the functions often combined in MFP 300 connected to the network line 400.

At S3114, CPU 310 determines whether or not the combination information is received from the server computer 200. If it is determined that the combination information is received from server computer 200 (YES at S3114), the process proceeds to S3116. Otherwise (NO at S3114), the process returns to S3114, and waits until it is determined that the combination information is received from server computer 200. At S3116, CPU 310 stores the combination information received from server computer 200 in the function combination management table. At this time, CPU 310 stores a management table in which the combination number field for the past six months removed from the function combination management table shown in FIG. 5 as the function combination management table, in HDD 340. Thus, it is possible in each of the plurality of MFPs 300 to store user by user the functions often combined in MFP 300 connected to the network line 400.

Figure 8:
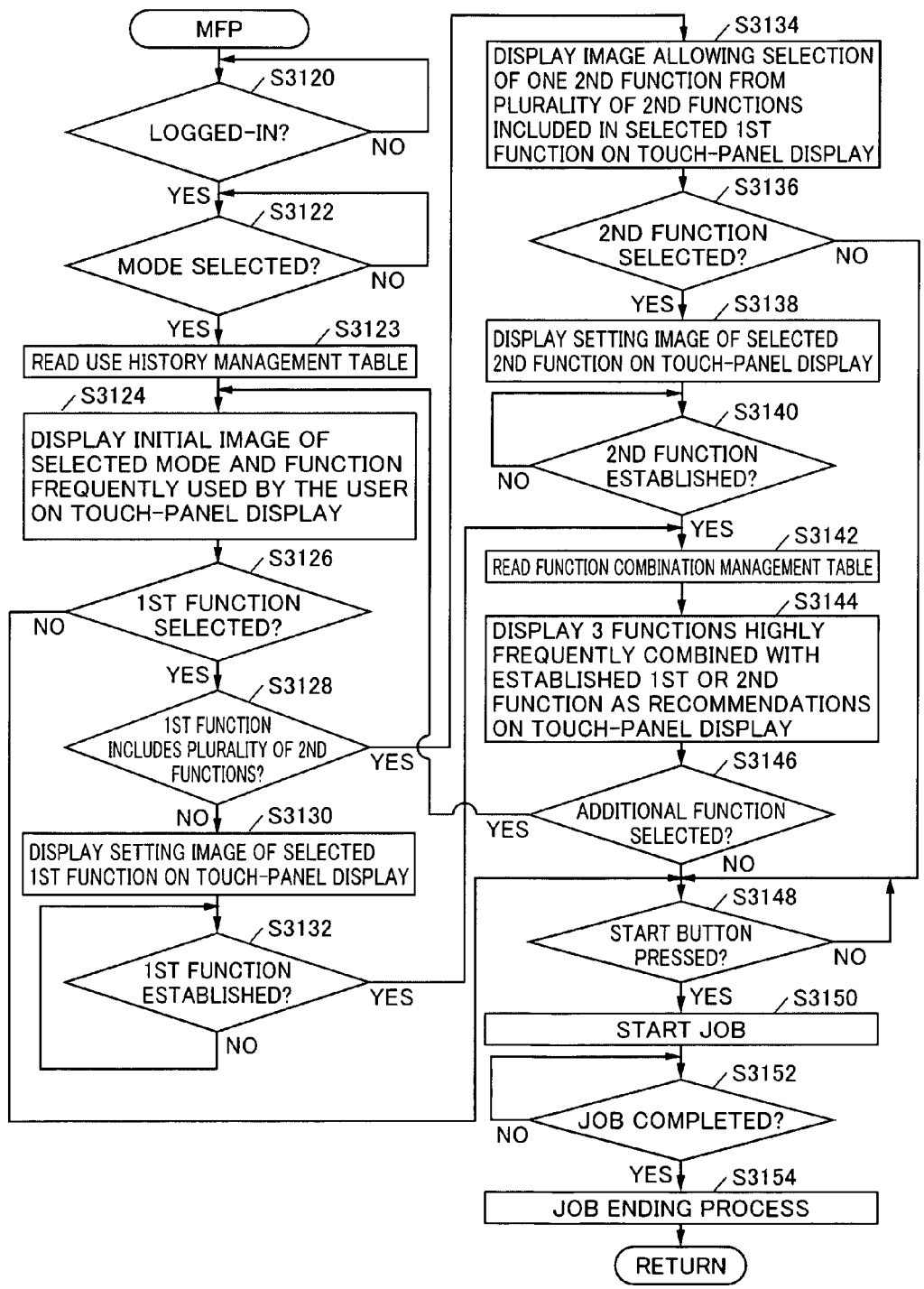
FIG. 8 is a flowchart representing a control structure of a function setting program executed by the MFP of FIG. 1.

Referring to FIG. 8, a control structure of a computer program executed by MFP 300 for allowing a user to set a function in the network image forming system in accordance with the present embodiment will be described.

At S3120, CPU 310 of MFP 300 determines whether or not a user of MFP 300 has requested log-in and successfully logged-in. At this time, CPU 310 displays a user number input image or a fingerprint input image on touch-panel display 380, and when a user number is input or a fingerprint of the user is input, it determines that the user who is going to use MFP 300 has logged-in. If the user who is to log-in is determined to be a user registered in advance based on the user number or the user fingerprint, CPU 310 permits log-in. If CPU 310 permits log-in, a determination of successful log-in is made. If it is determined that the user of MFP 300 has successfully logged-in (YES at S3120), the process proceeds to S3122. Otherwise (NO at S3120), the process returns to S3120, and waits until it is determined that a user of MFP 300 has logged-in. The process is the same as that of S3100 described above.

At S3122, CPU 310 determines whether or not mode selection is done. This MFP 300 has three modes, that is, "copy mode", "fax/image transmission mode" and "document filing mode." By way of example, when any of software buttons corresponding to the three modes displayed at the top of touch-panel display 380 is pressed, CPU 310 determines that the user has made mode selection. If it is determined that the user has made mode selection (YES at S3122), the process proceeds to S3123. Otherwise (NO at S3122), the process returns to S3122, and waits until it is determined that the user has made mode selection.

At S3123, CPU 310 reads the user-by-user use history management table (the management table of FIG. 6 with the set number field of past six months removed) from HDD 340.

At S3124, CPU 310 displays an initial image of the selected mode and a function that is used with high frequency by the user, on touch-panel display 380. At this time, CPU 310 displays the function that is used with high frequency by the user, on touch-panel display 380 based on the user-by-user use history management table. The number of functions displayed here is not specifically limited. Not only one but two or more functions may be displayed. It is also possible that a management table including the field of set numbers of past six months is used as the user-by-user use history management table stored in HDD 340 of MFP 300, and (any number of) functions of which number of settings in the past six months exceeds a threshold value (for example, 20 times) may be displayed. On the initial image of the copy mode, "color mode", "copy density", "magnification", "document direction" and "paper size & direction" are displayed, together with software buttons for changing such settings. Among software buttons for selecting functions, there is a button for selecting functions such as "duplex copy" and "finishing" (hereinafter referred to as "first function") and a button for selecting a "special function" (also referred to as the "first function"). If the "special function" is selected, it is possible to additionally select a function or functions such as "2-in-1/4-in-1", "margin" and "frame erasure" (hereinafter referred to as "second function"). Specifically, the first function refers to functions displayed on the initial image of each mode, including functions that can be selected by simply selecting the first function, and a function of selecting the second function. No matter whether "2-in-1/4-in-1" as the "special function" is selected first and then "duplex copy" is selected or "duplex copy" is selected first and then "2-in-1/4-in-1" as the "special function" is selected, it is considered that the function of "duplex copy" and the function of "2-in-1/4-in-1" are combined. It is noted that the present invention is not limited to such a menu hierarchy.

At S3126, CPU 310 determines whether or not the user has selected the first function. If it is determined that the user has selected the first function (YES at S3126), the process proceeds to S3128. Otherwise (NO at S3126), the process proceeds to S3148.

At S3128, CPU 310 determines whether or not the first function selected by the user includes a plurality of second functions. If the first function includes a plurality of second functions (YES at S3128), the process proceeds to S3134. Otherwise (NO at S3128), the process proceeds to S3130.

At S3130, CPU 310 displays a setting image for the first function selected by the user, on touch-panel display 380. At S3132, CPU 310 determines whether or not the first function has been established. Here, by way of example, if a prescribed item is set on the setting image of the first function (for example, "duplex copy") displayed on the touch-panel display and thereafter an "OK" button is pressed, CPU 310 determines that the first function is established. If it is determined that the first function is established (YES at S3132), the process proceeds to S3142. Otherwise (NO at S3132), the process returns to S3132 to wait until the first function is established.

At S3134, CPU 310 displays an image allowing selection of one second function among a plurality of second functions included in the selected first function, on touch-panel display 380. At S3136, CPU 310 determines whether the user has selected the second function. If it is determined that the user has selected the second function (YES at S3136), the process proceeds to S3138. Otherwise (NO at S3136), the process proceeds to S3148.

At S3138, CPU 310 displays a setting image for the second function selected by the user on touch-panel display 380. At S3140, CPU 310 determines whether or not the second function is established. Here, by way of example, if a prescribed item is set on the setting image of the second function (for example, "2-in-1/4-in-1") displayed on the touch-panel display and thereafter an "OK" button is pressed, CPU 310 determines that the second function is established. If it is determined that the second function is established (YES at S3140), the process proceeds to S3142. Otherwise (NO at S3140), the process returns to S3140 to wait until the second function is established.

At S3142, CPU 310 reads the function combination table (the management table of FIG. 5 with the combination number field of the past six months removed) from HDD 340. At S3144, CPU 310 displays as recommendations, three functions of higher priority that are combined with high frequency with the established first function or the established second function, on touch-panel display 380. The number of recommended functions displayed at this time is not limited to three, and larger number of recommended functions may be displayed. It is also possible that a management table including the field of combination number of past six months is used as the function combination management table stored in HDD 340 of MFP 300, and (any number of) functions of which number of combinations in the past six months exceeds a threshold value (for example, 20 times) may be displayed.

At S3146, CPU 310 determines whether or not the user further selects an additional function. At this time, since the first function or the second function has been established (YES at S3132 or YES at S3140), it means that an additional function is further combined therewith. Here, by way of example, if a software button on touch-panel display 380 corresponding to a function displayed as a recommendation is pressed, CPU 310 determines that an additional function is selected. If it is determined that an additional function is selected (YES at S3146), the process returns to S3124. Otherwise (NO at S3146), the process proceeds to S3148. If it is determined that an additional function is selected (YES at S3146), the process may proceed to S3124, S3130 or S3138, in accordance with the selected function.

At S3148, CPU 310 determines whether or not the start button is pressed. If it is determined that the start button is pressed (YES at S3148), the process proceeds to S3150. Otherwise (NO at S3148), the process returns to S3148. If it is not determined that the start button is pressed (NO at S3148), the process may proceed to S3124.

At S3150, CPU 310 starts a job in accordance with the set function or functions. At this time, by way of example, image data of an original document read by the document reading unit is output to the image forming unit, and at the image forming unit the image represented by the image is printed on a sheet of recording paper, in MFP 300.

At S3152, CPU 310 determines whether the job is completed. If it is determined that the job in MFP 300 is completed (YES at S3152), the process proceeds to S3154. Otherwise (NO at S3152), the process returns to S3152 and waits until it is determined that the job in MFP 300 is completed.

At S3154, CPU 310 performs an ending process for the job that is determined to be completed. An example of the ending process includes transmission of basic function (mode), set function (1), set function (2) . . . as the use history information to server computer 200, of S3102 shown in FIG. 7. The ending process may be a different process, such as an accounting process.

[Operation]

The operation of network image forming system in accordance with the present embodiment based on the structures and flowcharts as above will be described in the following.

<Use History Processing Operation>

Using the use history management table shown in FIG. 4, the function combination management table shown in FIG. 5, the user-by-user use history management table shown in FIG. 6 and the flowchart of FIG. 7, the use history processing operation of the network image forming system will be described.

First, the user requests log-in, by inputting a user number or by scan-inputting the fingerprint of the user, on touch-panel display 380 of MFP 300 to be used. If the user who requested log-in is a user registered in advance to allow use of MFP 300 (YES at S3100), the user ID is stored in MFP 300 (S3102), and the user can be uniquely identified.

When the user selects a desired function (for example, copy function) and performs a job (for example, a collective duplex copying) and the job is completed (YES at S3104) in MFP 300, the basic function (mode) and set function (1), set function (2), . . . selected by the user for the job in MFP 300 are transmitted as the user use history information, together with the user ID, to server computer 200 (S3106).

In response to such an operation of MFP 300, server computer 200 receives the user use history information from MFP 300 (YES at S2100). The received user use history information is stored, together with the user ID, in HDD 240, in the form of the use history management table shown in FIG. 4 (S2102).

When a predetermined time for collecting the user-by-user use history is reached (YES at S2104), based on the use history information stored in the use history management table, the display priority based on the frequency of use of MFP 300 is calculated user by user (S2106). The calculated display priority is stored in the user-by-user use history management table shown in FIG. 6 (S2108). Based on the user-by-user use history management table, the user-by-user use history information (set function, used function and the display priority) is transmitted to MFP 300 (S2110).

When a predetermined time for collecting the functions combined is reached (YES at S2104), based on the use history information stored in the use history management table, the functions combined with the set function are collected (S2112). The collected results are stored in the function combination management table shown in FIG. 5 (S2114). Based on the function combination management table, the combination information (set function, combined function and display priority) is transmitted to MFP 300 (S2116).

In response to such an operation of server computer 200, each of the plurality of MFPs 300 receives the user-by-user use history information from server computer 200 (YES at S3110). The received user-by-user use history information is stored in the form of the user-by-user use history management table (the user-by-user use history management table shown in FIG. 6 with the set number field of the past six months removed), in HDD 340 (S3112).

Further, each of the MFPs 300 receives the combination information from server computer 200 (YES at S3114). The received combination information is stored in the form of the function combination management table (the function combination management table of FIG. 5 with the field of combination number of the past six months removed) in HDD 340 (S3116).

In server computer 200, pieces of use history information from the plurality of MFPs 300 are received and the use history management table (FIG. 4) is updated on real time basis and the use history of each user is accumulated in the use history management table. While the use history of each user is accumulated in the use history management table, the user-by-user use history and the combined functions are collected at a preset time interval. Here, based on the use history information stored in the use history management table, the function set by the user and the functions combined with the set function are collected, and the user-by-user use history management table and the function combination management table are updated at a constant time interval. The user-by-user use history information and the combination information reflecting the updated function combination management table are transmitted to the plurality of MFPs 300.

<Function Setting Operation>

Using the flowchart of FIG. 8 and the image transitions on touch-panel display 380 shown in FIGS. 9 to 12, the function setting operation of the network image forming system will be described.

Figure 9:
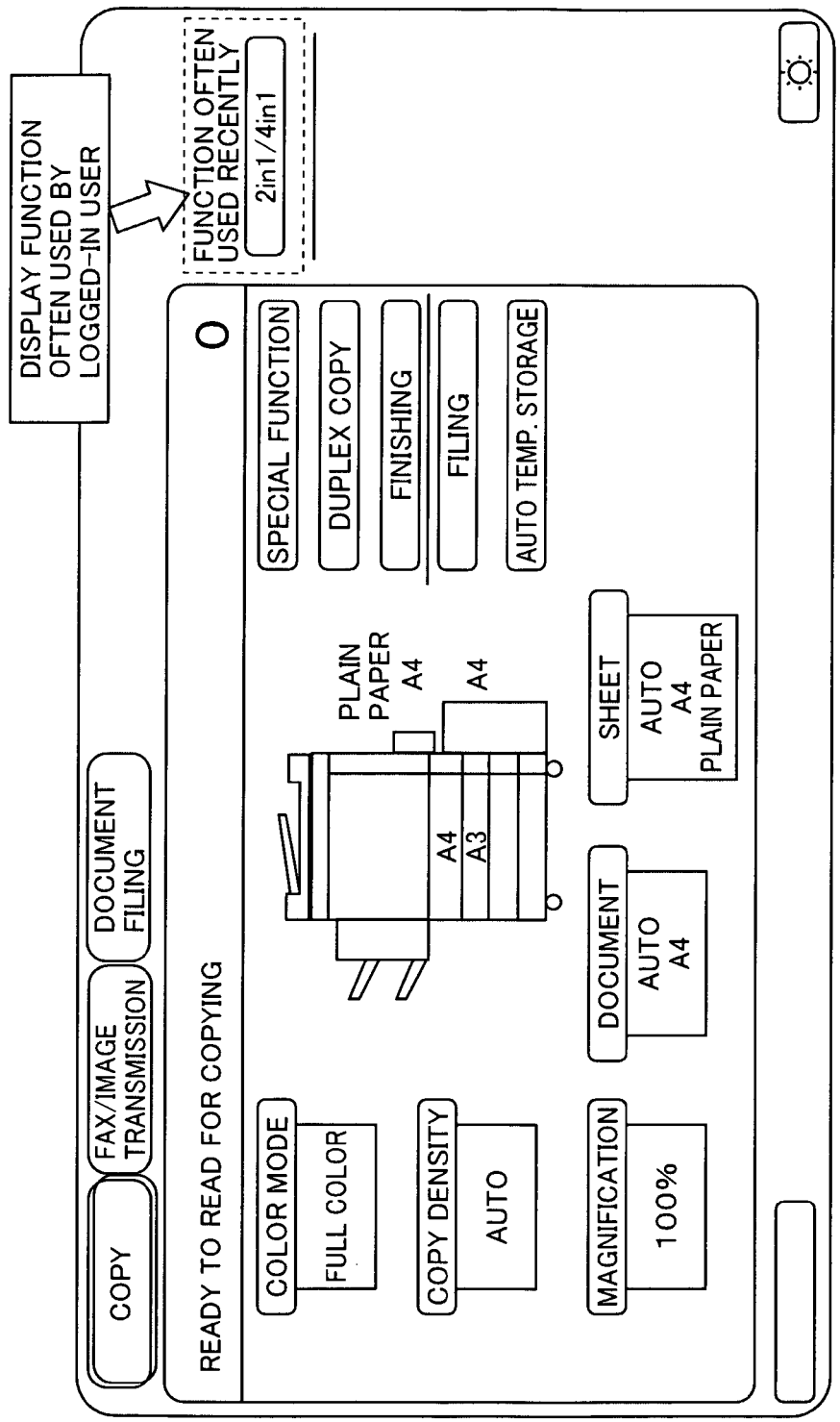
FIGS. 9 to 12 are transition diagrams showing exemplary displays on a touch-panel display when the program of FIG. 8 is executed.

When the user logs-in to an MFP 300 to be used (YES at S3120) and selects a desired mode (YES at S3122), the user-by-user use history management table (the management table of FIG. 6 with the set number field of past six months removed) is read (S3123), the initial image of the selected mode is displayed on touch-panel display 380, and the function used with high frequency by the logged-in user is displayed (S3124). FIG. 9 shows an exemplary initial image of the copy mode displayed on touch-panel display 380, when the "copy" mode button on the top left part of touch-panel display 380 is pressed. In FIG. 9, "2-in-1/4-in-1" (collective) is displayed as a function often used recently (past six months) by the logged-in user. Though only one function often used recently (past six months) by the logged-in user is displayed in FIG. 9, two or more functions may be displayed as described above.

Figure 10:
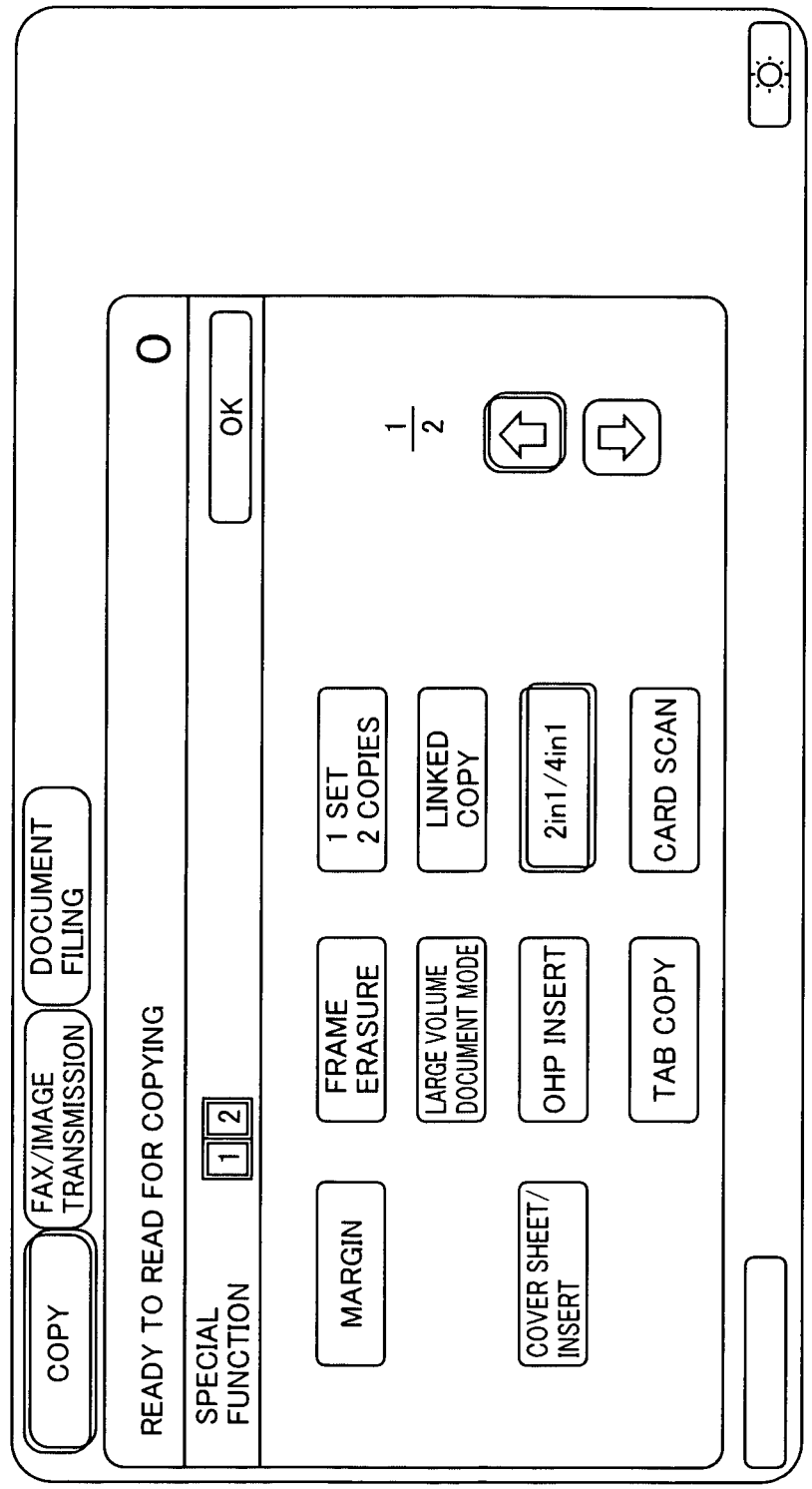

In FIG. 9, if the user presses the "special function" button (YES at S3126), since the special function includes a plurality of functions (YES at S3128), an image allowing selection of one second function among the plurality of second functions included in the selected special function (first function) is displayed on touch-panel display 380 (S3134). FIG. 10 shows an exemplary image of the special function menu, displayed on touch-panel display 380 after the "special function" button is pressed in FIG. 9.

Figure 11:
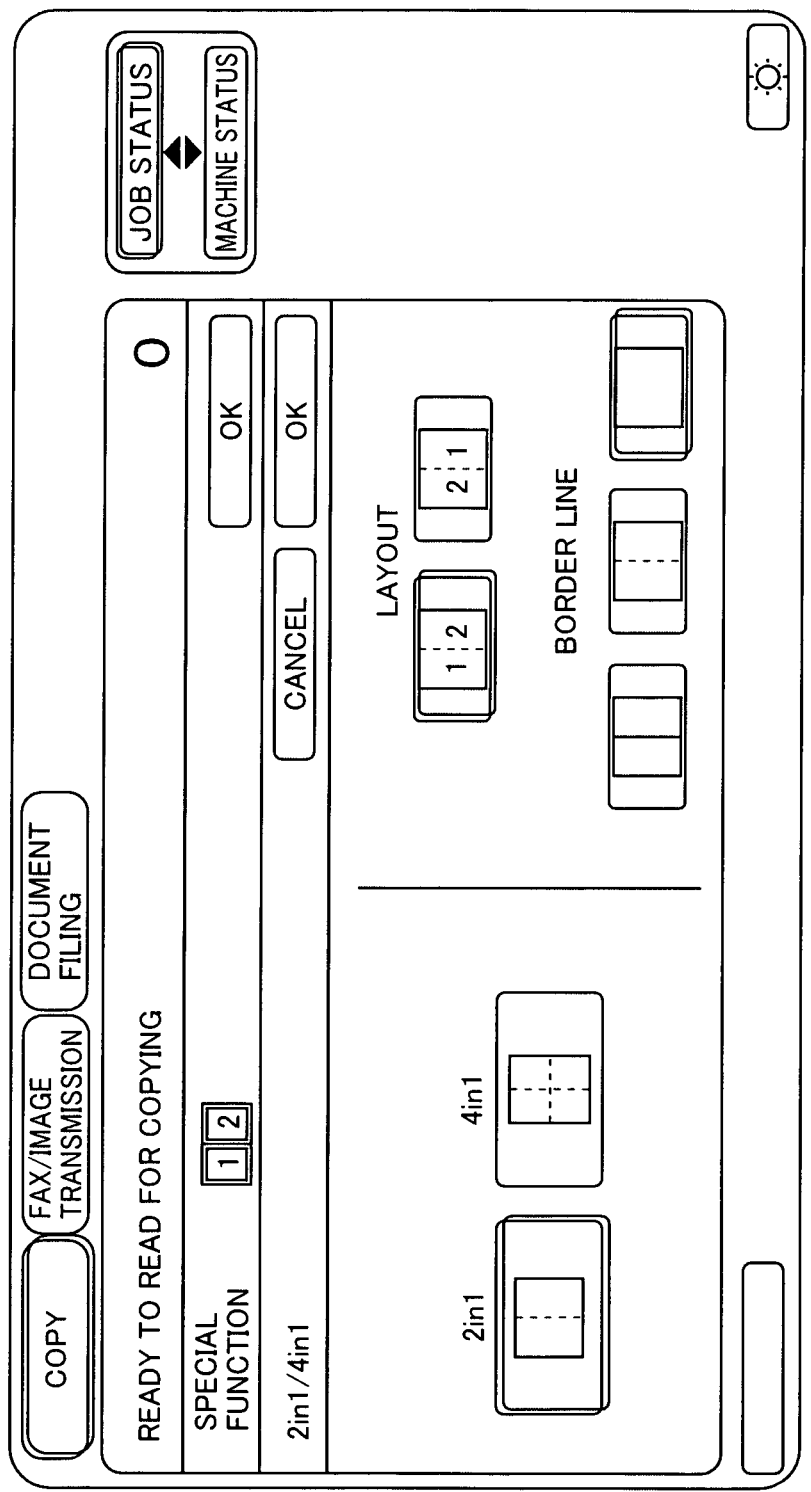

In FIG. 10, when the user presses the "2-in-1/4-in-1" button (YES at S3136), the setting image for the selected second function is displayed on touch-panel display 380 (S3138). FIG. 11 is an exemplary image of "2-in-1/4-in-1" setting menu displayed on touch-panel display 380 after the "2-in-1/4-in-1" button is pressed in FIG. 10.

Figure 12:
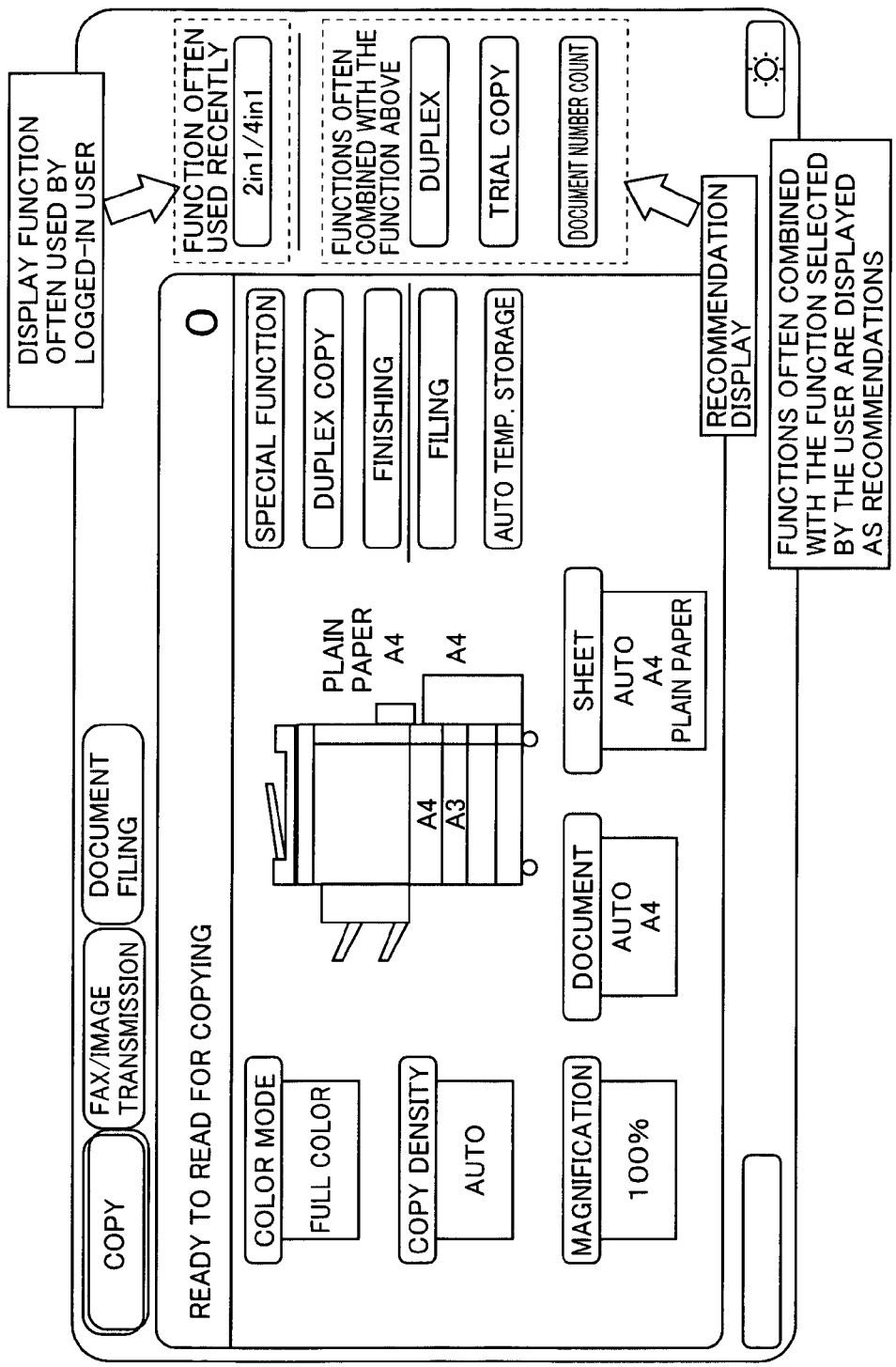

In FIG. 11, when the user presses a setting button for a detailed item (2-page collection or 4-page collection, layout, border line) related to the "2-in-1/4-in-1" and presses "OK" button for "2-in-1/4-in-1", the second function is established (YES at S3140). When "2-in-1/4-in-1" as the second function is established, the function combination management table is read (S3142), and three functions of higher priority that are highly frequently combined with the established "2-in-1/4-in-1" function are displayed as recommended functions, as shown in FIG. 12. In FIG. 12, three functions often combined recently (in the past six months) with the function selected by the logged-in user are displayed, though the display is not limited to such three functions. Here, as shown in FIG. 12, the display returns to the special function menu, an image allowing selection of one function from a plurality of functions included in the special function is displayed on touch-panel display 380, and "duplex copy", "trial copy" and "count document number" that are often combined with the "2-in-1/4-in-1" function established to be selected are displayed (S3144).

As described above, in the network image forming system in accordance with the present embodiment, the function often used recently by the logged-in user is displayed and, when the user selects one function from various functions of the multi-function peripheral, a function or functions used in combination with the selected function by a user in the past (here, the user is the logged-in user himself/herself or other users) are displayed as recommended functions. Therefore, it is possible for the logged-in user to easily select the function he/she often uses recently. Further, different from the conventional art, a function that is often used by others in combination with the function the logged-in user selected is displayed. By such a display, it becomes possible to efficiently know an effective combination of functions of the multi-function peripheral that is not known to the user but used by other users. When the function of server computer is implemented by one of the plurality of multi-function peripherals, such an effect can be realized without necessitating a server computer. Further, such a function can be realized simply by a multi-function peripheral having the function of a server computer, without necessitating a plurality of multi-function peripherals.

It is also possible to have the function often used by the user and the function or functions often combined with the function displayed on touch-panel display 380, before the user who logged-in to use the MFP selects any function. Specifically, the function often used recently by the logged-in user and the function or functions often used in combination with the often used function are displayed.

—Second Embodiment—

In the following, the second embodiment of the present invention will be described.

Server computer 200 and MFP 300 forming the network image forming system in accordance with the present embodiment store management tables and execute programs that are partially different from those stored and executed by server computer 200 and MFP 300 of the first embodiment described above.

In the present embodiment, server computer 200 stores a group ID uniquely identifying a group to which a user belongs, in association with the user ID, and stores use history of the user in MFP 300 received through network line 400 in the use history management table together with the user ID uniquely identifying the user ID. Server computer 200 collects, group by group, the functions used in MFP 300 based on the use history of the users, and stores the results in group-by-group use history management table. Server computer 200 transmits the group-by-group use history information to MFP 300 through network line 400. Based on the group-by-group use history information received from server computer 200, MFP 300 displays a function used with high frequency in the group to which the logged-in user belongs, on the touch-panel display.

Server computer 200 collects the pieces of combination information of functions used in combination in MFP 300, based on the use histories of many users, and stores the results in the group-by-group function combination management table. Server computer 200 transmits the group-by-group combination information to MFP 300 through network line 400. Based on the group-by-group combination information received from server computer 200, MFP 300 displays a function often combined with the function selected by the logged-in user, in the group to which the logged-in user belongs, on the touch-panel display.

In this manner, in the present embodiment, the function often used by the group to which the logged-in user belongs and the function often combined with the function in the group are displayed on the touch-panel display.

In this manner, in the present embodiment, the function often used by the group to which the user who logged-in to use the MFP belongs, and the function often combined with the function selected by the user in the group to which the user belongs are displayed on the touch-panel display. In the following, the network image forming system operating in this manner will be described.

[Management Table Configuration]

Referring to FIG. 13, the group management table stored in HDD 240 of server computer 200 will be described. The group management table is maintained, for example, by an administrator of the system, and it stores which user belongs to which department (group).

As shown in FIG. 13, the group management table consists of a field for storing user ID for uniquely identifying a user, and a field for storing group ID for uniquely identifying a group to which the user belongs, in correspondence with the user ID.

The group management table shown in FIG. 13 stores that to a group identified by the group ID of "G001", users identified by user IDs "000001", "000002" and "000004" belong, and to a group identified by the group ID of "G002", users identified by user IDs "000003" and "000005" belong.

Referring to FIG. 14, the group-by-group function combination management table will be described. The group-by-group combination management table corresponds to the function combination management table (FIG. 5) in accordance with the first embodiment.

As shown in FIG. 14, the group-by-group function combination management table stores the function combination management table shown in FIG. 5 group by group. Therefore, the group-by-group function combination management table consists of; a field for storing the set function (corresponding to set function (1) of FIG. 4); a field for storing a function (corresponding to set function (2) or set function (3) of FIG. 4) combined with the set function; a field for storing the number of combinations representing how many times the function has been combined in the past six months; and a field for storing the display priority based on the number of combinations.

Though the period for collecting the number of combinations is set to past six months in the example of FIG. 14 as in the case of FIG. 5, the present invention is not limited to the above. The period may be shorter or longer, or the period may be set by a user (in this case, the user may include an administrator).

Referring to FIG. 15, the group-by-group use history management table will be described. The group-by-group use history management table corresponds to the use history management table (FIG. 6) in accordance with the first embodiment.

Referring to FIG. 15, the group-by-group use history management table stores the use history management table shown in FIG. 6 group by group. Therefore, the group-by-group use history management table consists of; a field for storing group ID for uniquely identifying a group; a field for storing basic function used (copy mode, fax/image transmission mode, document filing mode and the like); a field for storing the set function used with the basic function; a field for storing the number of settings representing how many times the function is set in the past six months; and a field for storing display priority based on the number of settings.

The use history management table in accordance with the present embodiment is the same as the use history management table (FIG. 4) in accordance with the first embodiment.

[Software Configuration]

Figure 16:
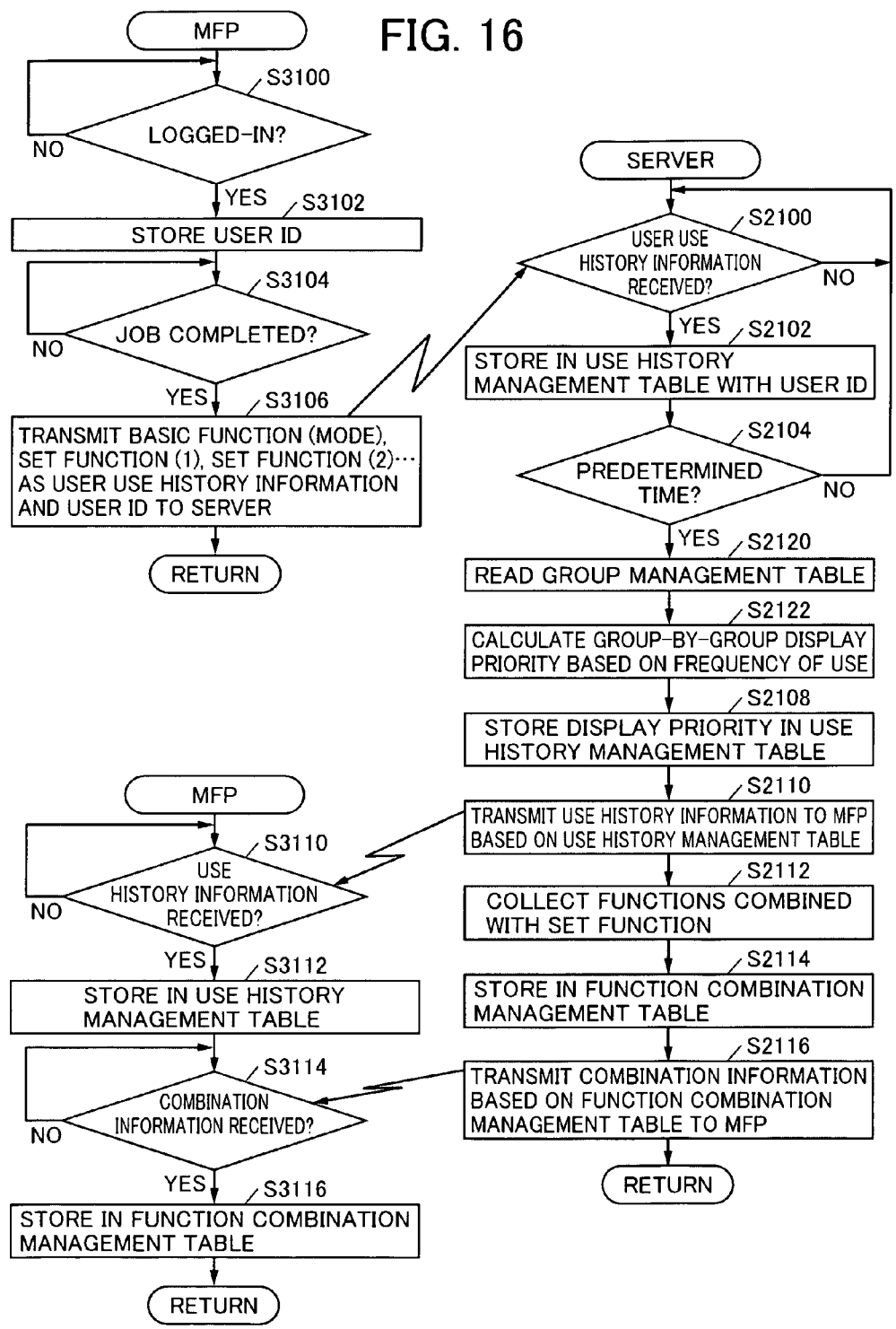
FIG. 16 is a flowchart representing a control structure of a use history processing program executed by the server computer and the MFP in accordance with the second embodiment of the present invention, respectively.

FIG. 16 is a flowchart representing a control structure of a use history processing program executed by server computer 200 and MFP 300 in accordance with the present embodiment. The flowchart corresponds to the flowchart of FIG. 7 described above. The flowchart shown in FIG. 7 differs from the flowchart shown in FIG. 16 in that the process of step S2106 in FIG. 7 is changed to processes of steps S2120 and S2122 in FIG. 16, and that the user-by-user use history management table is changed to the group-by-group use history management table.

Referring to FIG. 16, at S2120, CPU 210 reads the group management table (FIG. 13). At S2122, CPU 210 calculates the display priority based on the frequency of use of MFP 300 group by group, based on the use history information stored in the use history management table.

Figure 17:
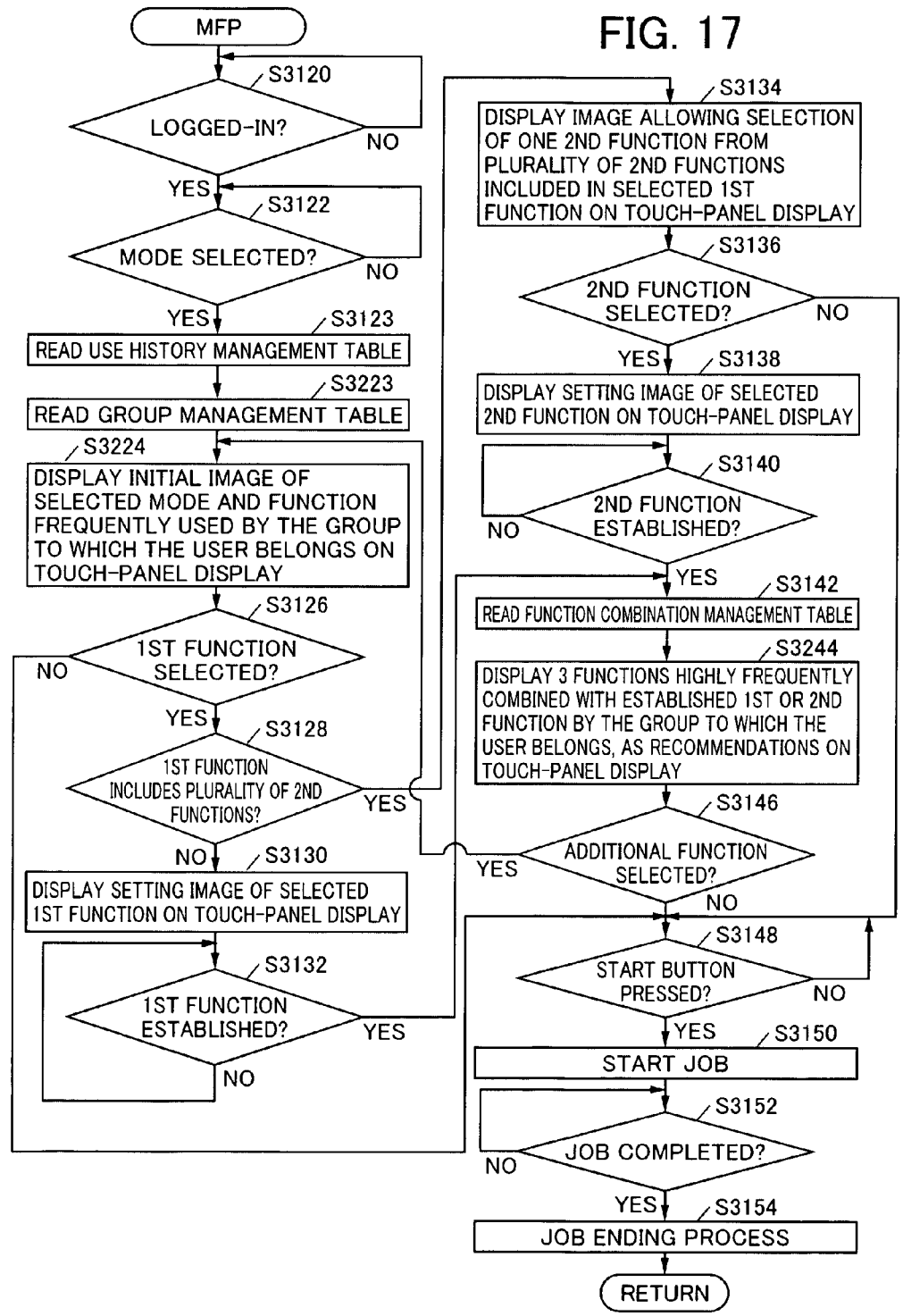
FIG. 17 is a flowchart representing a control structure of a function setting program executed by the MFP in accordance with the second embodiment of the present invention.

FIG. 17 is a flowchart representing a function setting program executed by MFP 300 in accordance with the present embodiment. The flowchart corresponds to the flowchart of FIG. 8 described above. The flowchart shown in FIG. 8 differs from the flowchart of FIG. 17 in that the process of S3124 in FIG. 8 is changed to the process of S3224 in FIG. 17, the process of S3223 is added to the process of S3224, that the process of S3144 is changed to the process of S3244 in FIG. 17, the function combination management table is changed to the group-by-group function combination management table, and that the user-by-user use history management table is changed to the group-by-group use history management table.

Referring to FIG. 17, at S3123, CPU 310 reads the group-by-group use history management table (FIG. 15). At S3223, CPU 310 reads the group management table (FIG. 13). At S3224, CPU 310 displays, together with the initial image of the selected mode, the function of high frequency of use in the group to which the user belongs, on touch-panel display 380. At this time, CPU 310 displays a function used with high frequency in the group to which the user belongs on touch-panel display 380, based on the read group-by-group use history management table. The number of functions displayed at this time is not specifically limited. Not only one but two or more functions may be displayed. It is also possible that a management table including the field of set numbers of past six months is used as the group-by-group use history management table stored in HDD 340 of MFP 300, and (any number of) functions of which number of settings in the past six months exceeds a threshold value (for example, 120 times) may be displayed.

At S3244, CPU 310 displays as recommendations, three functions of higher priority that are combined with high frequency with the established first function or the established second function in the group to which the user belongs, on touch-panel display 380. The number of recommended functions displayed at this time is not limited to three, and larger number of recommended functions may be displayed. It is also possible that a management table including the field of combination number of past six months is used as the function combination management table stored in HDD 340 of MFP 300, and (any number of) functions of which number of combinations in the past six months exceeds a threshold value (for example, 120 times) may be displayed.

[Operation]

The operation of network image forming system in accordance with the present embodiment based on the structure and flowcharts as above will be described. Description of operations similar to those of the first embodiment above will not be repeated here.

<Use History Processing Operation>

Using the use history management table shown in FIG. 4, the group management table shown in FIG. 13, the group-by-group function combination management table shown in FIG. 14 and the group-by-group use history management table shown in FIG. 15, as well as the flowchart shown in FIG. 16, the use history processing operation of the network image forming system will be described.

When a user logs in to MFP 300 to form an image, in response to an operation of MFP 300, server computer 200 receives the user use history information from MFP 300 (YES at S2100). The received user use history information is stored, together with the user ID, in the form of the use history management table shown in FIG. 4, in HDD 240 (S2102).

If a predetermined time for collecting the user-by-user use history is reached (YES at S2104), the group management table is read (S2120), and based on the use history information stored in the use history management table, the display priority based on the frequency of use of MFP 300 is calculated group by group to which the user belongs (S2122). The calculated display priority is stored in the group-by-group use history management table (S2108). Based on the group-by-group use history management table, the group-by-group use history information (set function, used function and display priority) is transmitted to MFP 300 (S2110).

When a predetermined time for collecting the functions combined is reached (YES at S2104), based on the use history information stored in the use history information management table, the functions combined with the set function in the group to which the logged-in user belongs are collected (S2112). The collected results are stored in the group-by-group function combination management table shown in FIG. 14 (S2114). Based on the group-by-group function combination management table, group-by-group combination information (set function, combined function and display priority) is transmitted to MFP 300 (S2116).

In response to such an operation of server computer 200, each of the plurality of MFPs 300 receives the group-by-group use history information from server computer 200 (YES at S3110). The received group-by-group use history information is stored in the form of a group-by-group use history management table (the group-by-group use history management table shown in FIG. 15 with the field of set numbers of the past six months removed), in HDD 340 (S3112).

Further, each of the plurality of MFPs 300 receives the group-by-group combination information from server computer 200 (YES at S3114). The received group-by-group combination information is stored in the form of a function combination management table (the group-by-group function combination management table shown in FIG. 14 with the field of combination number of the past six months removed), in HDD 340 (S3116).

In server computer 200, the use history information is received from the plurality of MFPs 300 and the use history management table (FIG. 4) is updated on the real time basis, and the use history of each user is accumulated in the use history management table. While the use history of each user is accumulated in the use history management table, the group-by-group use history and the group-by-group combined functions are collected at a preset time interval. Here, based on the use history information stored in the use history management table, the set function and the functions combined with the set function are collected group by group, and the group-by-group use history management table and the group-by-group function combination management table are updated at a constant time interval. The group-by-group use history information and the group-by-group combination information reflecting the updated group-by-group function combination management table are transmitted to the plurality of MFPs 300.

<Function Setting Operation>

Using the flowchart of FIG. 17, as well as the image transitions of touch-panel display 380 shown in FIGS. 10 and 11 (first embodiment) and FIGS. 18 and 19, the function setting operation of network image forming system will be described.

When the user logs-in to an MFP 300 to be used (YES at S3120) and selects a desired mode (YES at S3122), the group-by-group use history management table (the management table of FIG. 15 with the set number field of past six months removed) and the group management table are read (S3123, S3223). Based on the group management table, the group to which the logged-in user belongs is extracted, the initial image of the selected mode is displayed on touch-panel display 380, and the function used with high frequency by the group to which the logged-in user belongs is displayed (S3224). FIG. 18 corresponds to FIG. 9 of the first embodiment described above, and shows an exemplary initial image of the copy mode displayed on touch-panel display 380, when the "copy" mode button on the top left part of touch-panel display 380 is pressed. In FIG. 18, "2-in-1/4-in-1" (collective) is displayed as a function often used recently (past six months) by the group to which the logged-in user belongs. Though only one function often used recently (past six months) by the group to which the logged-in user belongs is displayed in FIG. 18, two or more functions may be displayed as described above.

Figure 18:
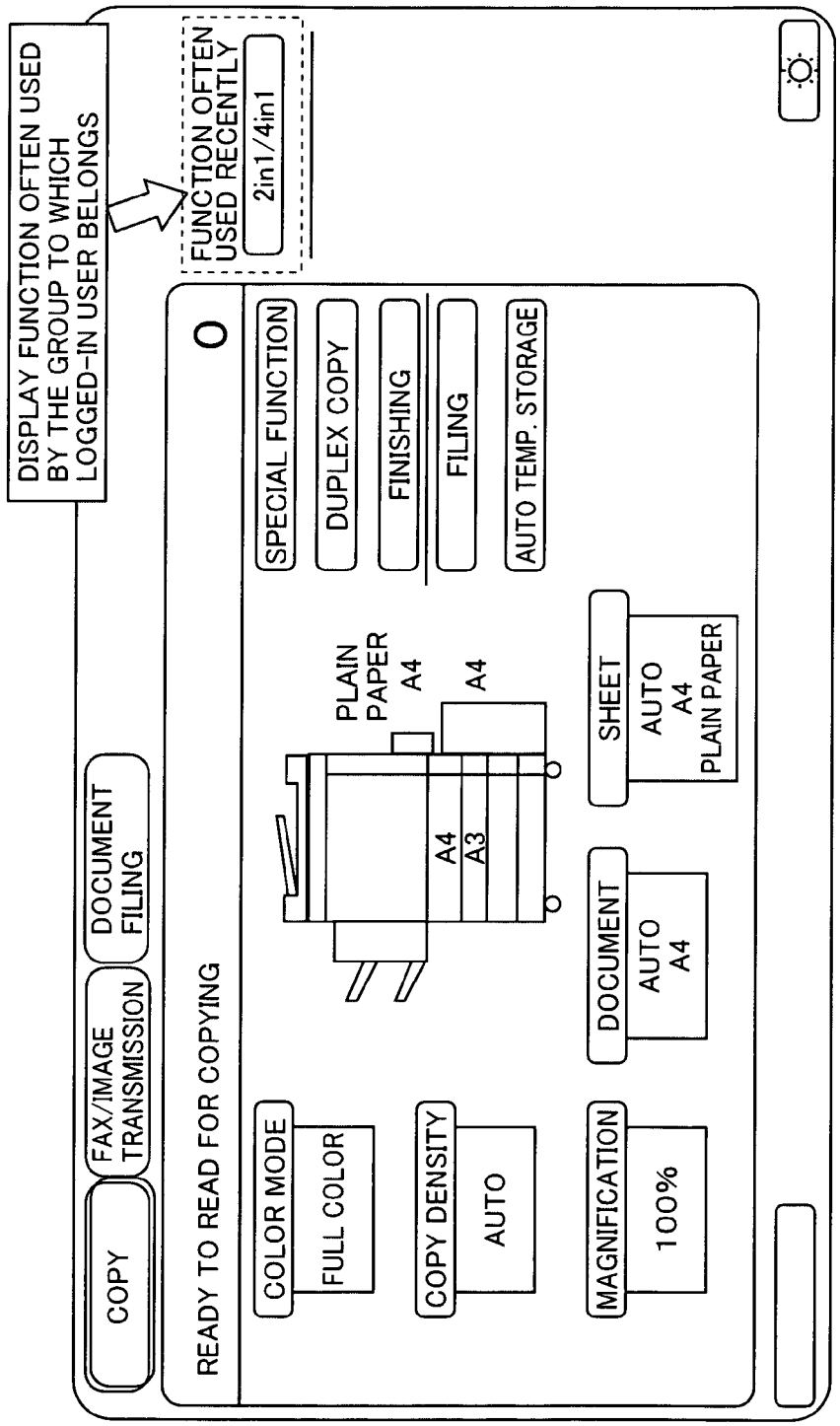
FIGS. 18 and 19 are transition diagrams showing exemplary displays on a touch-panel display when the program of FIG. 17 is executed.
Figure 19:
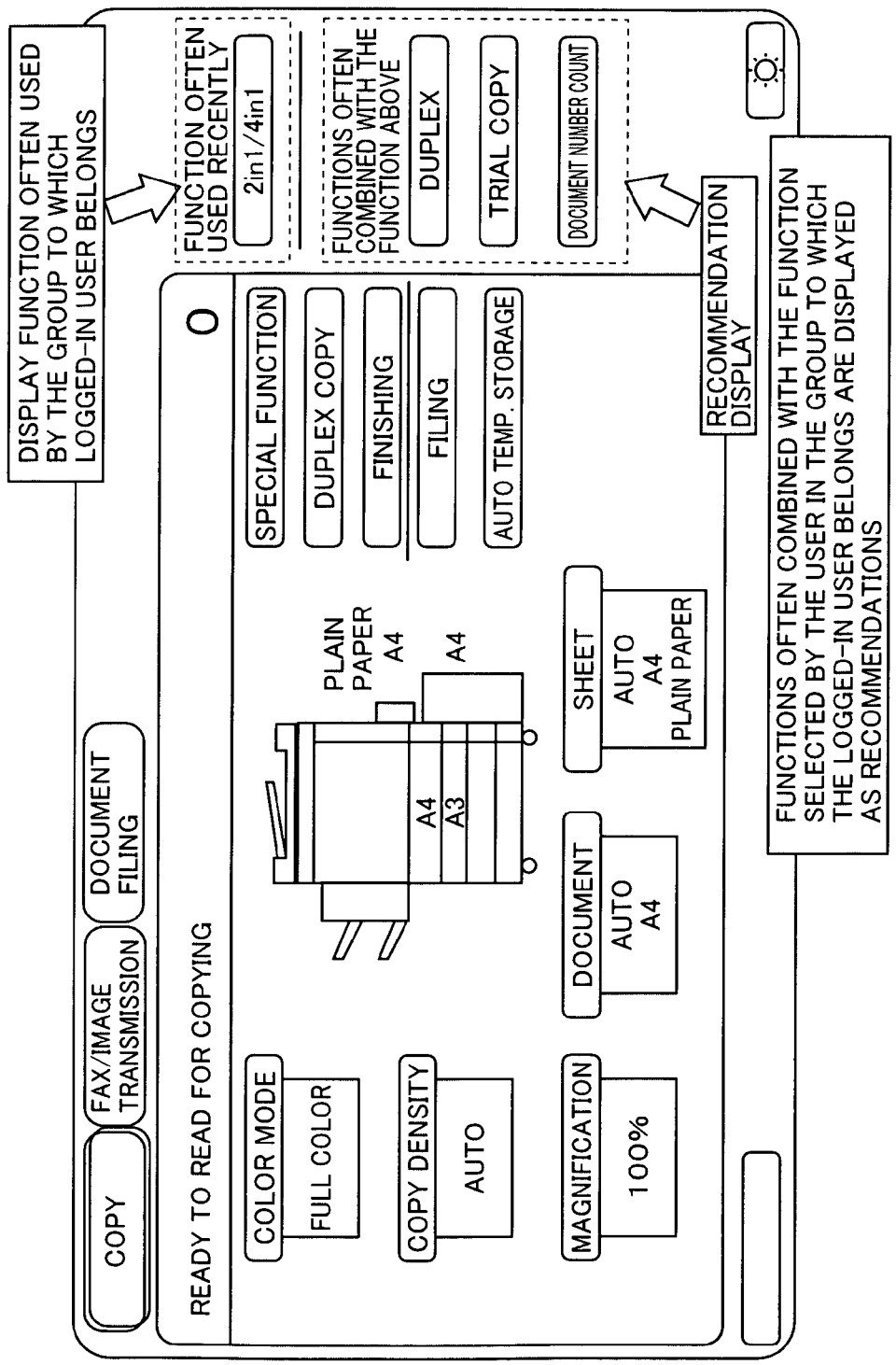

In FIG. 18, if the user presses the "special function" button (YES at S3126), since the special function includes a plurality of functions (YES at S3128), an image allowing selection of one second function among the plurality of second functions included in the selected special function (first function) is displayed on touch-panel display 380 (S3134). FIG. 10 shows an exemplary image of the special function menu, displayed on touch-panel display 380 after the "special function" button is pressed in FIG. 9.

In FIG. 10, when the user presses the "2-in-1/4-in-1" button (YES at S3136), the setting image for the selected second function is displayed on touch-panel display 380 (S3138). FIG. 11 is an exemplary image of "2-in-1/4-in-1" setting menu displayed on touch-panel display 380 after the "2-in-1/4-in-1" button is pressed in FIG. 10.

In FIG. 11, when the user presses a setting button for a detailed item (2-page collection or 4-page collection, layout, border line) related to the "2-in-1/4-in-1" and presses "OK" button for "2-in-1/4-in-1", the second function is established (YES at S3140). When "2-in-1/4-in-1" as the second function is established, the group-by-group function combination management table is read (S3142), and three functions of higher priority that are highly frequently combined in the group to which the user belongs with the established "2-in-1/4-in-1" function are displayed as recommended functions, as shown in FIG. 19. In FIG. 19, three functions often combined recently (in the past six months) in the group to which the user belongs, with the function selected by the logged-in user are displayed, though the display is not limited to such three functions. Here, as shown in FIG. 19, the display returns to the special function menu, an image allowing selection of one function from a plurality of functions included in the special function is displayed on touch-panel display 380, and "duplex copy", "trial copy" and "count document number"

that are often combined in the group to which the user belongs with the "2-in-1/4-in-1" function established to be selected are displayed (S3244).

As described above, in the network image forming system in accordance with the present embodiment, the function often used recently by the group to which the logged-in user belongs is displayed and, when the user selects one function from various functions of the multi-function peripheral, a function or functions used in the past in combination with the selected function by the group to which the user belongs are displayed as recommended functions. Therefore, it is possible for the logged-in user to easily select the function often used recently by the group to which the user belongs. Further, different from the conventional art, a function that is often used by the group in combination with the function the logged-in user selected is displayed. By such a display, it becomes possible to efficiently know an effective combination of functions of the multi-function peripheral that is not known to the user but used by other users of the group to which the user belongs. When the function of server computer is implemented by one of the plurality of multi-function peripherals, such an effect can be realized without necessitating a server computer. Further, such a function can be realized simply by a multi-function peripheral having the function of a server computer, without necessitating a plurality of multi-function peripherals.

It is also possible to have the function often used by the group to which the user belongs and the function or functions often combined with the function in the group to which the user belongs displayed on touch-panel display 380, before the user who logged-in to use the MFP selects any function. Specifically, the function often used recently by the group to which the logged-in user belongs, and the function or functions often used in combination with the often used function, are displayed.

—Third Embodiment—

In the following, the third embodiment will be described.

Server computer 200 and MFP 300 forming the network image forming system in accordance with the present embodiment store management tables and execute programs that are partially different from those stored and executed by server computer 200 and MFP 300 of the first and second embodiments described above.

In the present embodiment, server computer 200 stores a group ID uniquely identifying a group to which a user belongs, and stores use history of the user in MFP 300 received through network line 400 in the use history management table together with the user ID uniquely identifying the user ID. Server computer 200 collects, user by user, the functions used in MFP 300 based on the use history of the users, and stores the results in user-by-user use history management table. Server computer 200 transmits the user-by-user use history information to MFP 300 through network line 400. Based on the user-by-user use history information received from server computer 200, MFP 300 displays a function used with high frequency by the logged-in user, on the touch-panel display.

Server computer 200 collects the pieces of combination information of functions used in combination in MFP 300, based on the use histories of many users, and stores the results in the group-by-group function combination management table. Server computer 200 transmits the group-by-group combination information to MFP 300 through network line 400. Based on the group-by-group combination information received from server computer 200, MFP 300 displays a function often combined with the function selected by the logged-in user, in the group to which the logged-in user belongs, on the touch-panel display.

In this manner, in the present embodiment, the function often used by the user logged-in to use the MFP and the function often combined with the function selected by the user in the group to which the user belongs are displayed on the touch-panel display.

[Management Table Configuration]

In the present embodiment, the use history management table shown in FIG. 4, the user-by-user use history management table shown in FIG. 6, the group management table shown in FIG. 13, and the group-by-group function combination management table shown in FIG. 14 are used.

[Software Configuration]

Figure 20:
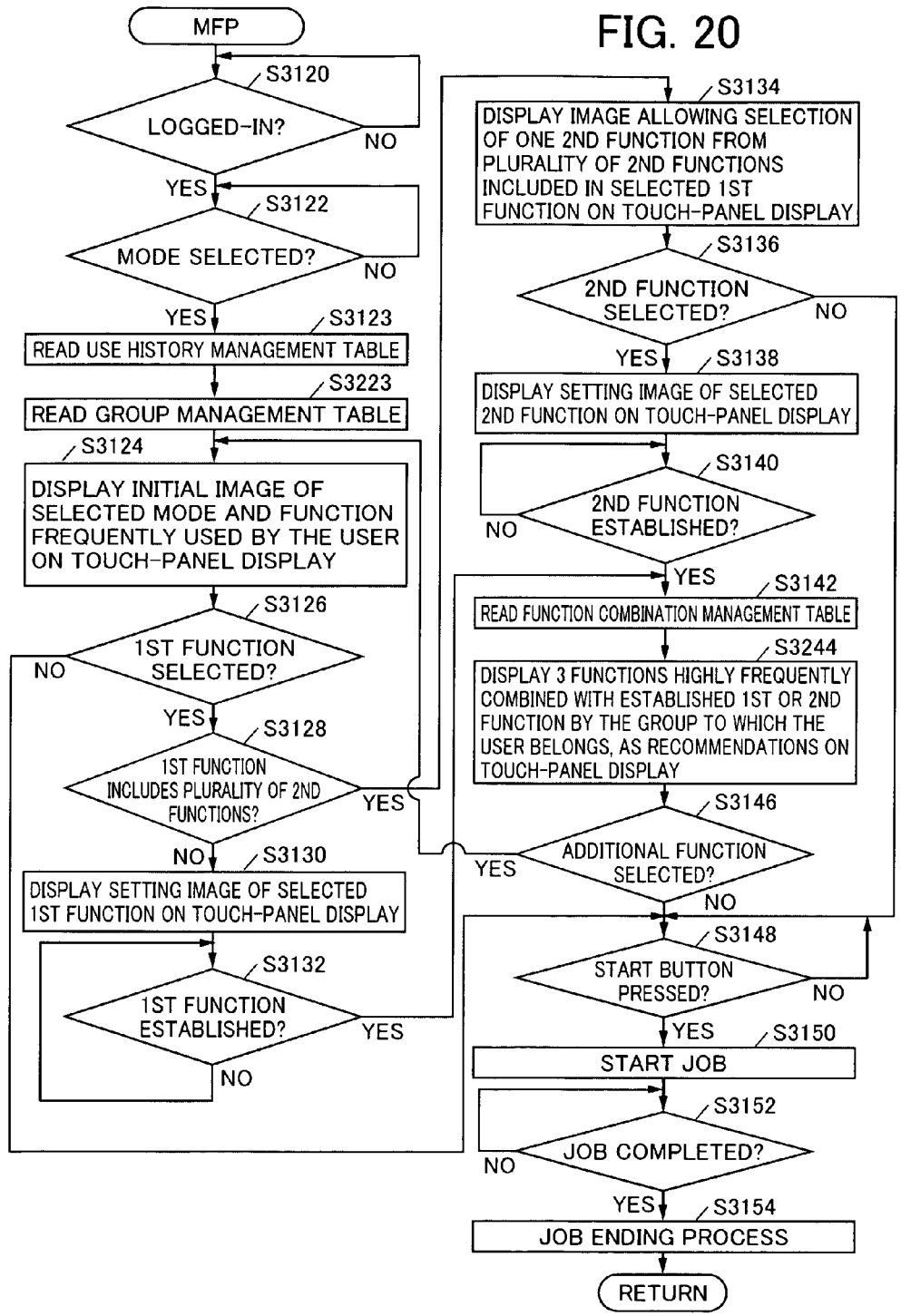
FIG. 20 is a flowchart representing a control structure of a function setting program executed by an MFP in accordance with a third embodiment of the present invention.

FIG. 20 is a flowchart representing a function setting program executed by MFP 300 in accordance with the present embodiment. The flowchart corresponds to the flowchart of FIG. 17 described above. The flowchart shown in FIG. 17 differs from the flowchart of FIG. 20 in that the process of S3224 in FIG. 17 is changed to the process of S3124 in FIG. 20 (returned to FIG. 8), and that the group-by-group use history management table is changed to the user-by-user use history management table (returned to the first embodiment).

Referring to FIG. 20, at S3123, CPU 310 reads the user-by-user use history management table (FIG. 6). At S3223, CPU 310 reads the group management table (FIG. 13). At S3124, CPU 310 displays, together with the initial image of the selected mode, the function used with high frequency by the user, on touch-panel display 380. At this time, CPU 310 displays a function used with high frequency by the user on touch-panel display 380, based on the read user-by-user use history management table. The number of functions displayed at this time is not specifically limited. Not only one but two or more functions may be displayed. It is also possible that a management table including the field of set numbers of past six months is used as the user-by-user use history management table stored in HDD 340 of MFP 300, and (any number of) functions of which number of settings in the past six months exceeds a threshold value (for example, 20 times) may be displayed.

At S3244, CPU 310 displays as recommendations, three functions of higher priority that are combined with high frequency with the established first function or the established second function in the group to which the user belongs, on touch-panel display 380. The number of recommended functions displayed at this time is not limited to three, and larger number of recommended functions may be displayed. It is also possible that a management table including the field of combination number of past six months is used as the function combination management table stored in HDD 340 of MFP 300, and (any number of) functions of which number of combinations in the past six months exceeds a threshold value (for example, 120 times) may be displayed.

[Operation]

The operation of network image forming system in accordance with the present embodiment based on the structure and flowcharts as above will be described. Description of operations similar to those of the first and second embodiments above (particularly, the use history processing operation) will not be repeated here.

<Function Setting Operation>

Figure 21:
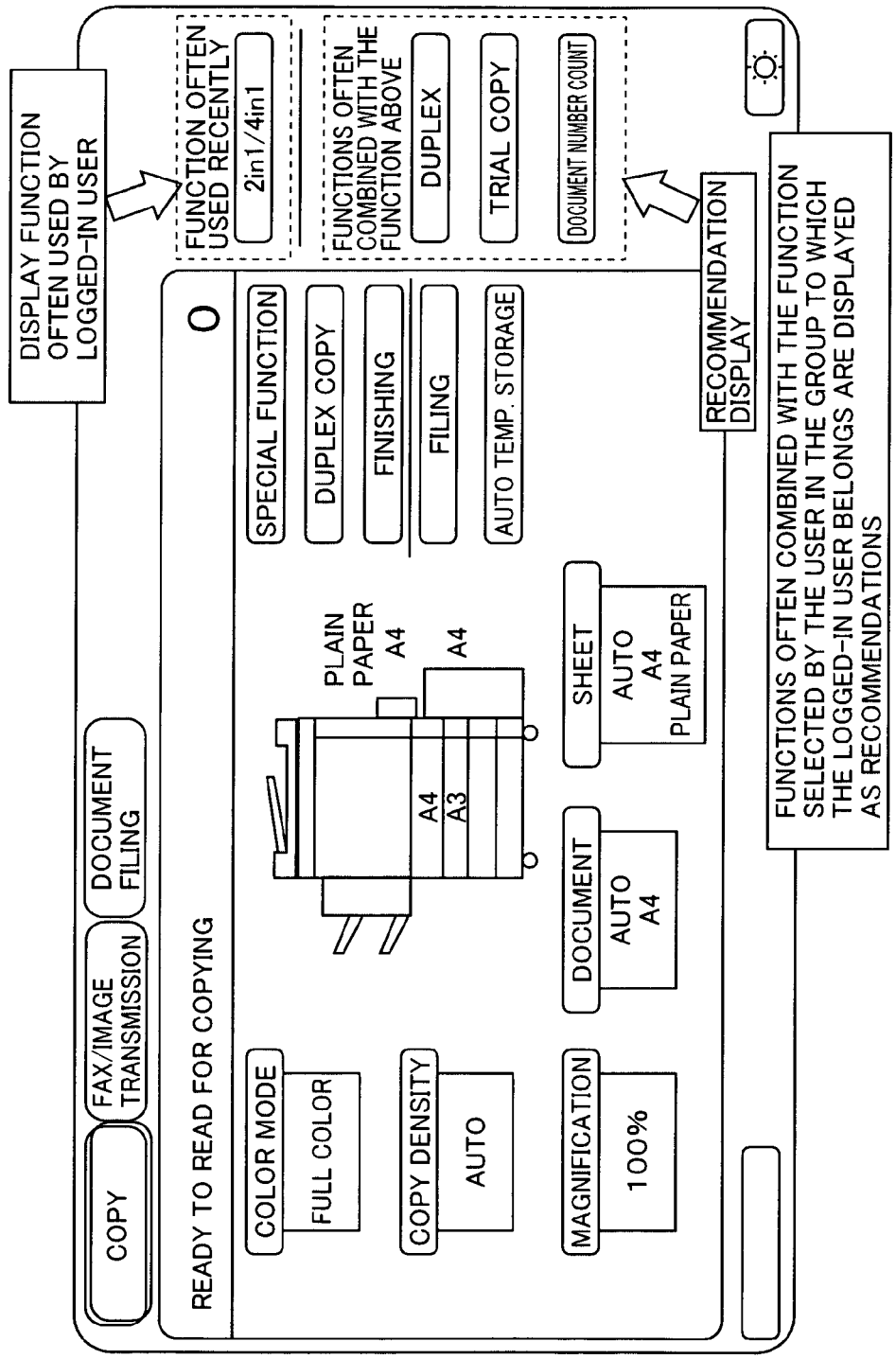
FIG. 21 is a transition diagram showing exemplary display on a touch-panel display when the program of FIG. 20 is executed.

Using the flowchart of FIG. 20, as well as the image transitions of touch-panel display 380 shown in FIGS. 9 to 11 (first embodiment) and FIG. 21, the function setting operation of network image forming system will be described.

When the user logs-in to an MFP 300 to be used (YES at S3120) and selects a desired mode (YES at S3122), the userby-user use history management table (the management table of FIG. 6 with the set number field of past six months removed) and the group management table are read (S3123, S3223). The initial image of the selected mode is displayed on touch-panel display 380, and the function used with high frequency by the logged-in user is displayed (S3124). At this time, an image shown in FIG. 9 is displayed on touch-panel display 380. FIG. 9 shows an exemplary initial image of the copy mode displayed on touch-panel display 380, when the "copy" mode button on the top left part of touch-panel display 380 is pressed. In FIG. 9, "2-in-1/4-in-1" (collective) is displayed as a function often used recently (past six months) by the logged-in user. Though only one function often used recently (past six months) by the logged-in user is displayed in FIG. 9, two or more functions may be displayed, as described above.

In FIG. 9, if the user presses the "special function" button (YES at S3126), since the special function includes a plurality of functions (YES at S3128), an image allowing selection of one second function among the plurality of second functions included in the selected special function (first function) is displayed on touch-panel display 380 (S3134). FIG. 10 shows an exemplary image of the special function menu, displayed on touch-panel display 380 after the "special function" button is pressed in FIG. 9.

In FIG. 10, when the user presses the "2-in-1/4-in-1" button (YES at S3136), the setting image for the selected second function is displayed on touch-panel display 380 (S3138). FIG. 11 is an exemplary image of "2-in-1/4-in-1" setting menu displayed on touch-panel display 380 after the "2-in-1/4-in-1" button is pressed in FIG. 10.

In FIG. 11, when the user presses a setting button for a detailed item (2-page collection or 4-page collection, layout, border line) related to the "2-in-1/4-in-1" and presses "OK" button for "2-in-1/4-in-1", the second function is established (YES at S3140). When "2-in-1/4-in-1" as the second function is established, the group-by-group function combination management table is read (S3142), and three functions of higher priority that are highly frequently combined in the group to which the user belongs with the established "2-in-1/4-in-1" function are displayed as recommended functions, as shown in FIG. 21. In FIG. 21, three functions often combined recently (in the past six months) in the group to which the user belongs, with the function selected by the logged-in user are displayed, though the display is not limited to such three functions, as described above. Here, as shown in FIG. 21, the display returns to the special function menu, an image allowing selection of one function from a plurality of functions included in the special function is displayed on touch-panel display 380, and "duplex copy", "trial copy" and "count document number" that are often combined in the group to which the user belongs with the "2-in-1/4-in-1" function established to be selected are displayed (S3244).

As described above, in the network image forming system in accordance with the present embodiment, the function often used recently by the logged-in user is displayed and, when the user selects one function from various functions of the multi-function peripheral, a function or functions used in the past in combination with the selected function by the group to which the user belongs are displayed as recommended functions. Therefore, it is possible for the logged-in user to easily select the function he/she often uses recently. Further, different from the conventional art, a function that is often used by the group to which he/she belongs (the group often forms similar documents) in combination with the function the logged-in user selected is displayed. By such a display, it becomes possible to efficiently know an effective combination of functions of the multi-function peripheral that is not known to the user but used by other users of the group. When the function of server computer is implemented by one of the plurality of multi-function peripherals, such an effect can be realized without necessitating a server computer. Further, such a function can be realized simply by a multi-function peripheral having the function of a server computer, without necessitating a plurality of multi-function peripherals.

It is also possible to have the function often used by the user and the function or functions often combined with the function in the group to which the user belongs displayed on touch-panel display 380, before the user who logged-in to use the MFP selects any function. Specifically, the function often used by the logged-in user and the function or functions often used in combination with the often used function are displayed.

—Fourth Embodiment—

In the following, the fourth embodiment of the present invention will be described.

MFP 300 forming the network image forming system in accordance with the present embodiment executes a function setting program partially different from that of MFP 300 in accordance with the first embodiment.

Figure 22:
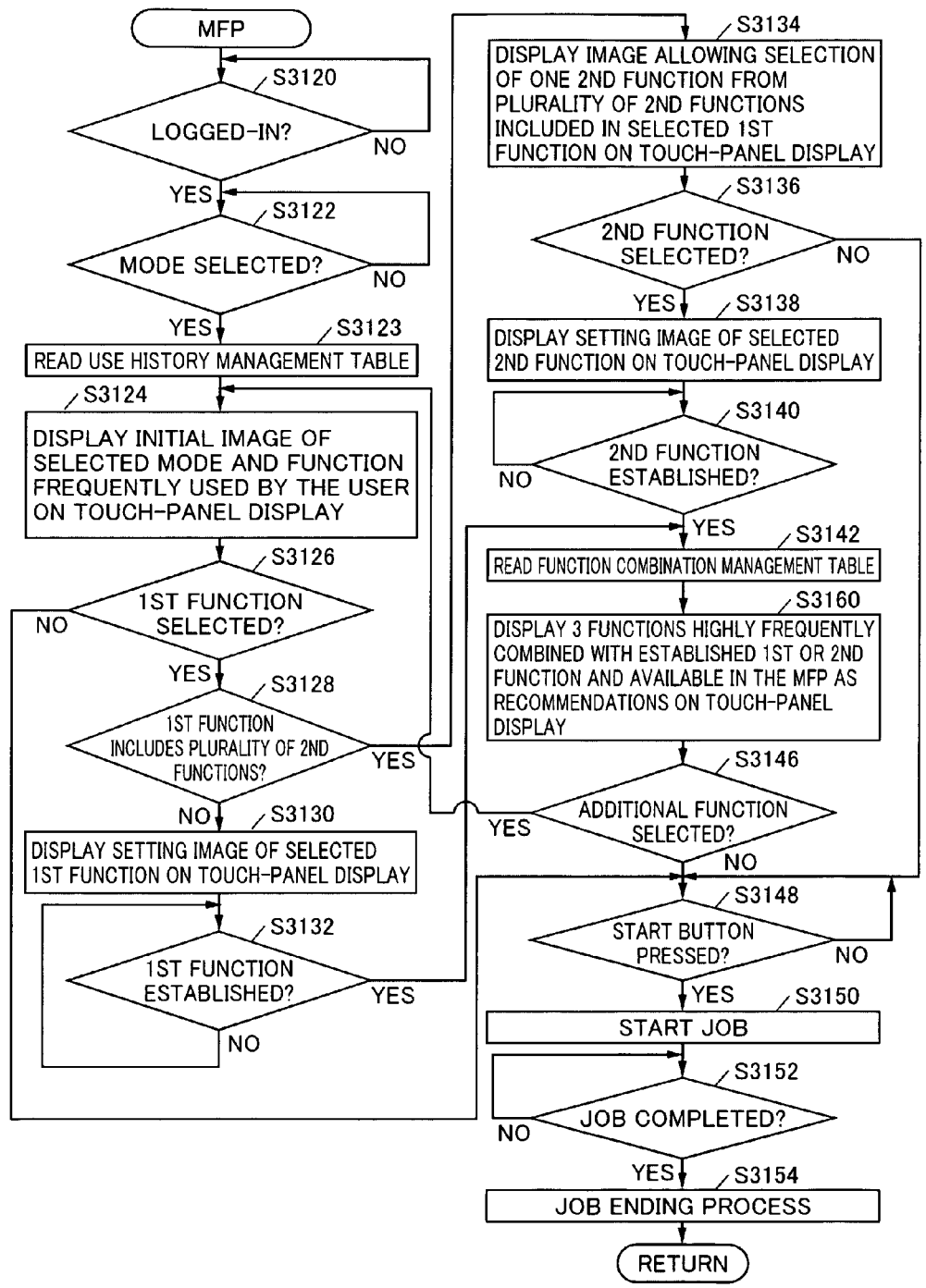
FIG. 22 is a flowchart representing a control structure of a function setting program executed by an MFP in accordance with a fourth embodiment of the present invention.

FIG. 22 is a flowchart representing a control structure of a function setting program executed by MFP 300 in accordance with the present embodiment. The flowchart corresponds to the flowchart of FIG. 8. The flowchart of FIG. 8 differs from the flowchart of FIG. 22 only in that the process of S3144 of FIG. 8 is changed to the process of S3160 in FIG. 22.

Referring to FIG. 22, at S3160, CPU 310 displays as recommendations, three functions of higher priority that are combined with high frequency with the established first function or the established second function and that can be provided by MFP 300, on touch-panel display 380. The number of recommended functions displayed at this time is not limited to three, and larger number of recommended functions may be displayed. It is also possible that a management table including the field of combination number of past six months is used as the function combination management table stored in HDD 340 of MFP 300, and (any number of) functions of which number of combinations in the past six months exceeds a threshold value (for example, 20 times) may be displayed.

According to such an approach, if the second function of "2-in-1/4-in-1" is established by way of example (YES at S3140), the function combination management table is read (S3142), and three functions of higher priority that are combined with high frequency (the number of combinations is large in the past six months) with the established "2-in-1/4-in-1" function and that can be provided by MFP 300, are displayed as recommended functions (S3160). An MFP 300 includes a basic unit, and it is often the case that a duplex copying unit, an automatic document feeder unit and the like are sold as options. Therefore, not all MFPs 300 have the same functions. Specifically, if a recommended function often used in an MFP 300 is displayed, it is senseless for a user of another MFP not having such a function. Therefore, in the multi-function peripheral in accordance with the present embodiment, only the recommendable functions that can be actually selected in combination are displayed as recommended functions, on the touch-panel display.

In such a case, it is preferred to notify the user that a function not selectable in MFP 300 is combined with high frequency, or to notify by which MFP 300 the function is available.

—Fifth Embodiment—

In the following, the fifth embodiment will be described.

Server computer 200 forming the network image forming system in accordance with the present embodiment stores, in HDD 240, a user-by-user weight (degree of proficiency) management table, not stored by the server computer 200 of the first embodiment, and executes a use history processing program partially different from that of server computer 200 in accordance with the first embodiment described above.

Referring to FIG. 23, the user-by-user weight (degree of proficiency) management table stored in HDD 240 of server computer 200 in accordance with the present embodiment will be described. The user-by-user weight management table stores, user by user, the degree of proficiency of each user (level of skill related to the functions of MFP 300). The weight of user-by-user weight management table should preferably be set in an objective and uniform manner and, therefore, the weight is set or changed, for example, by an administrator.

As shown in FIG. 23, the user-by-user weight management table consists of a field for storing user ID for uniquely identifying the user, and a field for storing the degree of proficiency of the user. The numerical value of user weight (degree of proficiency) is set such that a larger value is set for the higher skill of the function setting of MFP 300, and a smaller value is set for the lower skill.

FIG. 24 is a flowchart representing a control structure of a use history processing program executed by server computer 200 and MFP 300 in accordance with the present embodiment. The flowchart corresponds to the flowchart of FIG. 7 described above. The flowchart shown in FIG. 7 differs from the flowchart of FIG. 24 only in that the process of S2112 of FIG. 7 is changed to processes of S2130 and S2132 in FIG. 24.

Referring to FIG. 24, at S2130, CPU 210 reads the user-by-user weight (degree of proficiency) management table shown in FIG. 22. At S2132, based on the use history information stored in the use history management table and the user-by-user weight (degree of proficiency) stored in the user-by-user weight (degree of proficiency) management table, CPU 210 collects the functions combined with the set function. Here, collection is done, for example, with the weight multiplied.

In this manner, a recommended function that is frequently combined and combined by a user having higher degree of proficiency comes to have higher display priority. Therefore, according to the multi-function peripheral in accordance with the present embodiment, a recommended function that is combined by a user of higher degree of proficiency is given priority and displayed high on the list. When the user selects the recommended function displayed high on the list, the user can easily select a function used in combination by a skilled user. Therefore, even a beginner who does not know a combination of efficient functions can easily know the combination of efficient functions known by skilled users.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An information processing apparatus processing information related to a combination of functions selected by a user from a plurality of functions of an image forming apparatus, comprising:

an obtaining unit obtaining use history information related to the function selected by the user;

a use history storage unit storing, with user identification information, said use history information;

a first collecting unit collecting user-by-user history information related to frequency of use of functions, based on the stored use history information;

a second collecting unit collecting combination information related to frequency of combination between one function and another function, based on the stored use history information; and an applying unit applying the collected user-by-user history information and the combination information to said image forming apparatus.

2. The information processing apparatus according to claim 1, further comprising a degree information storing unit storing degree of proficiency of each user; wherein said second collecting unit collects said combination information using said degree of proficiency.

3. The information processing apparatus according to claim 2, wherein said second collecting unit collects said combination information such that the higher becomes the degree of proficiency, the higher becomes the frequency.

4. An image forming apparatus, comprising either the information processing apparatus according to claim 1 or a communication apparatus communicable with said information processing apparatus;

a user information storage unit storing said user-by-user history information and said combination information;

an identifying unit identifying a user who is to use the image forming apparatus;

a selecting unit allowing the user to select one function from a plurality of functions; and a display unit, displaying a function highly frequently used by said identified user based on said user-by-user history information, and displaying a function combined with high frequency with said selected function based on said combination information.

5. The image forming apparatus according to claim 4, wherein said display unit displays functions that are combined with high frequency in order, starting from a function of the highest frequency.

6. The image forming apparatus according to claim 4, wherein said display unit displays said function or functions that are combined with high frequency, excluding a function not available in the apparatus.

7. An image forming apparatus, comprising:

either the information processing apparatus according to claim 1 or a communication apparatus communicable with said information processing apparatus;

an identifying unit identifying a user who is to use the image forming apparatus;

a selecting unit allowing the user to select one function from a plurality of functions; and a display unit, displaying side by side a function highly frequently used by said identified user, determined based on said user-by-user history information, and a function combined with high frequency with said selected function, determined based on said combination information.

8. The image forming apparatus according to claim 7, wherein said display unit displays, in response to selection of said function highly frequently used by said identified user, said function combined with high frequency with said selected function, in place of said side-by-side display of said function highly frequently used by said identified user and said function combined with high frequency with said selected function.

9. An information processing apparatus processing information related to a combination of functions selected by a user from a plurality of functions of an image forming apparatus, comprising:
a storage unit storing, in relation to user identification information, group identification information indicating a department to which said user belongs;
a use history storage unit storing, with the user identification information, use history information;
a first collecting unit collecting user-by-user history information related to frequency of use of functions, based on the stored use history information;
a second collecting unit collecting group-by-group combination information related to frequency of combination between one function and another function, based on the stored use history information; and
an applying unit applying the collected user-by-user history information and the group-by-group combination information to said image forming apparatus.

10. The information processing apparatus according to claim 9, further comprising
a degree information storing unit storing degree of proficiency of each user; wherein
said second collecting unit collects said combination information using said degree of proficiency.

11. The information processing apparatus according to claim 10, wherein
said second collecting unit collects said combination information such that the higher becomes the degree of proficiency, the higher becomes the frequency.

12. An image forming apparatus, comprising
either the information processing apparatus according to claim 9 or a communication apparatus communicable with said information processing apparatus;
a group information storage unit storing said user-by-user history information and said group-by-group combination information;
an identifying unit identifying a user who is to use the image forming apparatus;
a selecting unit allowing the user to select one function from a plurality of functions; and
a display unit, displaying a function highly frequently used by said identified user based on said user-by-user history information, and displaying a function combined with high frequency with said selected function in the group to which said user belongs, based on said group-by-group combination information.

13. The image forming apparatus according to claim 12, wherein
said display unit displays functions that are combined with high frequency in order, starting from a function of the highest frequency.

14. The image forming apparatus according to claim 12, wherein
said display unit displays said function or functions that are combined with high frequency, excluding a function not available in the apparatus.

15. An image forming apparatus, comprising:
either the information processing apparatus according to claim 9 or a communication apparatus communicable with said information processing apparatus;
an identifying unit identifying a user who is to use the image forming apparatus;
a selecting unit allowing the user to select one function from a plurality of functions; and
a display unit, displaying side by side a function highly frequently used by said identified user, determined based on said user-by-user history information, and a function combined with high frequency with said selected function in the group to which said user belongs, determined based on said group-by-group combination information.

16. The image forming apparatus according to claim 15, wherein said display unit displays, in response to selection of said function highly frequently used by said identified user, said function combined with high frequency with said selected function in the group to which said user belongs, in place of said side-by-side display of said function highly frequently used by said identified user and said function combined with high frequency with said selected function in the group to which said user belongs.

17. An information processing apparatus processing information related to a combination of functions selected by a user from a plurality of functions of an image forming apparatus, comprising:
a storage unit storing, in relation to user identification information, group identification information indicating a department to which said user belongs;
a use history storage unit storing, with the user identification information, use history information;
a first collecting unit collecting group-by-group history information related to frequency of use of functions, based on the stored use history information;
a second collecting unit collecting group-by-group combination information related to frequency of combination between one function and another function, based on the stored use history information; and
an applying unit applying the collected group-by-group history information and the group-by-group combination information to said image forming apparatus.

18. The information processing apparatus according to claim 17, further comprising
a degree information storing unit storing degree of proficiency of each user; wherein
said second collecting unit collects said combination information using said degree of proficiency.

19. The information processing apparatus according to claim 18, wherein
said second collecting unit collects said combination information such that the higher becomes the degree of proficiency, the higher becomes the frequency.

20. An image forming apparatus, comprising either the information processing apparatus according to claim 17 or a communication apparatus communicable with said information processing apparatus;
a group information storage unit storing said group-by-group history information and said group-by-group combination information;
an identifying unit identifying a user who is to use the image forming apparatus;
a selecting unit allowing the user to select one function from a plurality of functions; and
a display unit, displaying a function highly frequently used by the group to which said identified user belongs, based on said group-by-group history information, and displaying a function combined with high frequency with said selected function in the group to which said user belongs, based on said group-by-group combination information.

21. The image forming apparatus according to claim 20, wherein
said display unit displays functions that are combined with high frequency in order, starting from a function of the highest frequency.

22. An image forming apparatus, comprising:
either the information processing apparatus according to claim 17 or a communication apparatus communicable with said information processing apparatus;
an identifying unit identifying a user who is to use the image forming apparatus;
a selecting unit allowing the user to select one function from a plurality of functions; and
a display unit, displaying side by side a function highly frequently used by the group to which said identified user belongs, determined based on said group-by-group history information, and a function combined with high frequency with said selected function in the group to which said user belongs, determined based on said group-by-group combination information.

23. The image forming apparatus according to claim 22, wherein said display unit displays, in response to selection of said function highly frequently used by the group to which said identified user belongs, said function combined with high frequency with said selected function in the group to which said user belongs, in place of said side-by-side display of said function highly frequently used by the group to which said identified user belongs and said function combined with high frequency with said selected function in the group to which said user belongs.

* * * * *